US012314937B2

(12) United States Patent
Zarick

(10) Patent No.: US 12,314,937 B2
(45) Date of Patent: May 27, 2025

(54) IMPLEMENTING BLOCKCHAIN-BASED TOKEN ATTRIBUTION WITH REDUCED COMPUTATIONAL COMPLEXITY

(71) Applicant: LayerZero Labs Canada, Inc., Vancouver (CA)

(72) Inventor: Ryan Zarick, Vancouver (CA)

(73) Assignee: LayerZero Labs Canada, Inc., Vancouver (CA)

( * ) Notice: Subject to any disclaimer, the term of this patent is extended or adjusted under 35 U.S.C. 154(b) by 35 days.

(21) Appl. No.: 18/223,587

(22) Filed: Jul. 19, 2023

(65) Prior Publication Data

US 2025/0029094 A1    Jan. 23, 2025

(51) Int. Cl.
*G06Q 40/00* (2023.01)
*G06Q 20/36* (2012.01)
*G06Q 20/38* (2012.01)

(52) U.S. Cl.
CPC ..... *G06Q 20/3672* (2013.01); *G06Q 20/3676* (2013.01); *G06Q 20/389* (2013.01)

(58) Field of Classification Search
None
See application file for complete search history.

(56) References Cited

U.S. PATENT DOCUMENTS

| | | | |
|---|---|---|---|
| 11,641,280 B1 | 5/2023 | Chapman | |
| 2017/0287068 A1* | 10/2017 | Nugent | G06Q 20/08 |
| 2018/0082390 A1* | 3/2018 | Leidner | G06Q 20/3674 |
| 2021/0019737 A1 | 1/2021 | Vladi | |
| 2021/0065070 A1* | 3/2021 | Augustine | H04L 9/0643 |
| 2021/0133700 A1 | 5/2021 | Williams | |
| 2023/0289337 A1 | 9/2023 | Zarick | |
| 2023/0289791 A1 | 9/2023 | Zarick | |
| 2023/0360007 A1* | 11/2023 | Krishnaswamy | G06Q 20/389 |

FOREIGN PATENT DOCUMENTS

WO    WO-2020223272 A1 *    11/2020    ......... G06F 16/2379

OTHER PUBLICATIONS

PCT Notification of Transmittal of the International Search Report and the Written Opinion of the International Searching Authority for PCT Application No. PCT/CA2023/051659, mailed on Jun. 19, 2024, 8 pages.
PCT Notification of Transmittal of the International Search Report and the Written Opinion of the International Searching Authority for PCT Application No. PCT/CA2023/051657, mailed Apr. 12, 2024, 9 pages.

* cited by examiner

*Primary Examiner* — Olabode Akintola
(74) *Attorney, Agent, or Firm* — Lowenstein Sandler LLP

(57) ABSTRACT

A method includes receiving a transfer request defining a transfer amount of tokens to be transferred from a sender associated with a first digital wallet to a receiver associated with a second digital wallet. The sender has a total token balance including an attributed token balance and a float token balance of float tokens, the attribution token balance and the float token balance are maintained within a token contract, and the receiver is assigned with a designated attribution property. The method further includes causing a transfer function of the token contract to be executed to transfer a set of tokens from the sender to the receiver. The set of tokens is determined based on a transaction payload comprising at least one of: a number of attributed tokens debited from the attributed token balance or a number of float tokens debited from the float token balance.

18 Claims, 15 Drawing Sheets

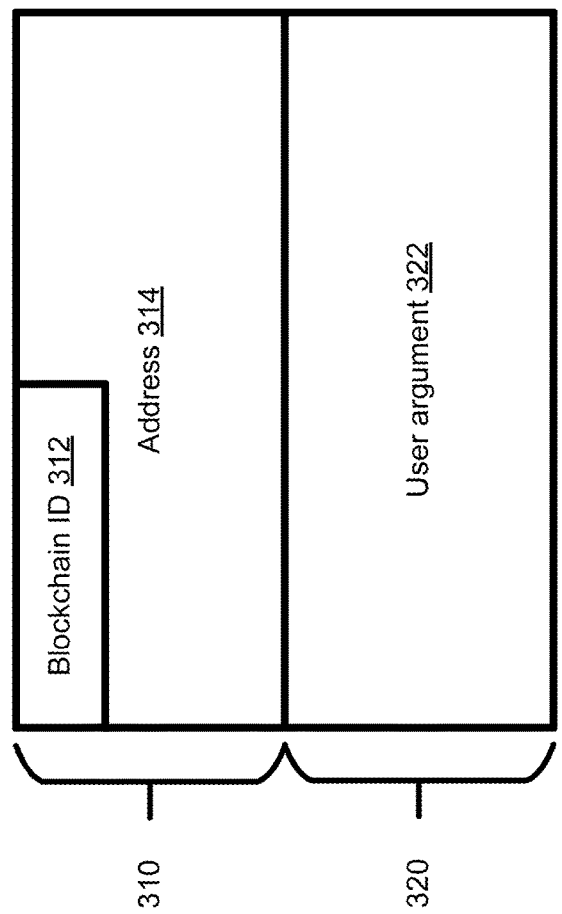

700

| Transaction 710 | Alice Token Balance 720 | Bob Token Balance 730 | Carol Token Balance 740 | Float Credit 750 | Total Circulation (Attribution) 760 |
|---|---|---|---|---|---|
| Alice mints 100 attributed tokens having property G (100 G) | 100 G \| 0 | 0 \| 0 | 0 \| 0 | G: 0 | G: 100 |
| Alice transfers 50 tokens to Bob | 50 G \| 0 | 50 G \| 0 | 0 \| 0 | G: 0 | G: 100 |
| Carol mints 100 attributed tokens having property R (100 R) | 50 G \| 0 | 50 G \| 0 | 100 R \| 0 | G: 0 R: 0 | G: 100 R: 100 |
| Bob transfers 20 tokens to Carol | 50 G \| 0 | 30 G \| 0 | 100 R \| 20 | G: 20 R: 0 | G: 100 R: 100 |
| Carol transfers 30 tokens to Alice | 70 G \| 10 | 30 G \| 0 | 90 R \| 0 | G: 0 R: 10 | G: 100 R: 100 |
| Bob redeems 20 G | 70 G \| 10 | 10 G \| 0 | 90 R \| 0 | G: 0 R: 10 | G: 80 R: 100 |
| Alice redeems 20 G and 10 R | 50 G \| 0 | 10 G \| 0 | 90 R \| 0 | G: 0 R: 0 | G: 60 R: 90 |

FIG. 7

IMPLEMENTING BLOCKCHAIN-BASED TOKEN ATTRIBUTION WITH REDUCED COMPUTATIONAL COMPLEXITY

TECHNICAL FIELD

The disclosure is generally related to blockchains and other distributed ledgers, and more particularly, to implementing blockchain-based token attribution with reduced computational complexity.

BACKGROUND

A network can include a decentralized network of nodes (i.e., computing devices), each of which maintains a copy of a distributed ledger, or blockchain, for tracking and managing transactions occurring within the network. More particularly, a blockchain can be a chain of cryptographically linked blocks of data ("blocks"), where each block of the blockchain maintains a record of one or more completed transactions. A transaction can reflect an update to data maintained by one or more accounts of the network. One example of a transaction is a transfer of a digital asset from one entity to another entity. Another example of a transaction is an exchange of digital assets. An exchange can involve the transfer of a digital asset from a source network having a source blockchain to a destination network having a destination blockchain. The nodes are responsible for managing (e.g., verifying) the transactions before appending them to the blockchain. At the core of the blockchain concept are the three pillars of decentralization, transparency, and immutability. No single node within a network can control a blockchain, and actions on the blockchain are verifiable and irreversible. These three pillars create a foundation upon which an entity can act without trusting another entity.

A block can include one or more transaction records and a cryptographic digest ("digest") of the previous block representing the previous batch of transactions. A digest can be generated by a one-way function that produces the same output data for a given input. A one-way function is a function that, from a computational complexity perspective, is "easy" to obtain an output for a given input, but "hard" to invert the output to identify the given input. For example, the digest can be a hash value, which is an output string of data generated by employing a hashing method to an input string of data. Although the input string can be arbitrarily large, the output hash value can be set to a fixed size in accordance with the hashing method used. Digests provide a secure way to maintain integrity of the blockchain. For example, any attempted change of an earlier block will result in the modified digest of the block, which would require modifications to all subsequent blocks in the blockchain (i.e., tamper-proofing).

BRIEF DESCRIPTION OF THE DRAWINGS

The disclosure is illustrated by way of examples, and not by way of limitation, and may be more fully understood with references to the following detailed description when considered in connection with the figures, in which:

FIG. 3 is a diagram of an example layout of an endpoint packet, in accordance with some implementations.

FIG. 7 is a table illustrating example token transactions that can be performed within a system that implements blockchain-based token attribution with reduced computational complexity, in accordance with some implementations.

DETAILED DESCRIPTION

Figure 1A:
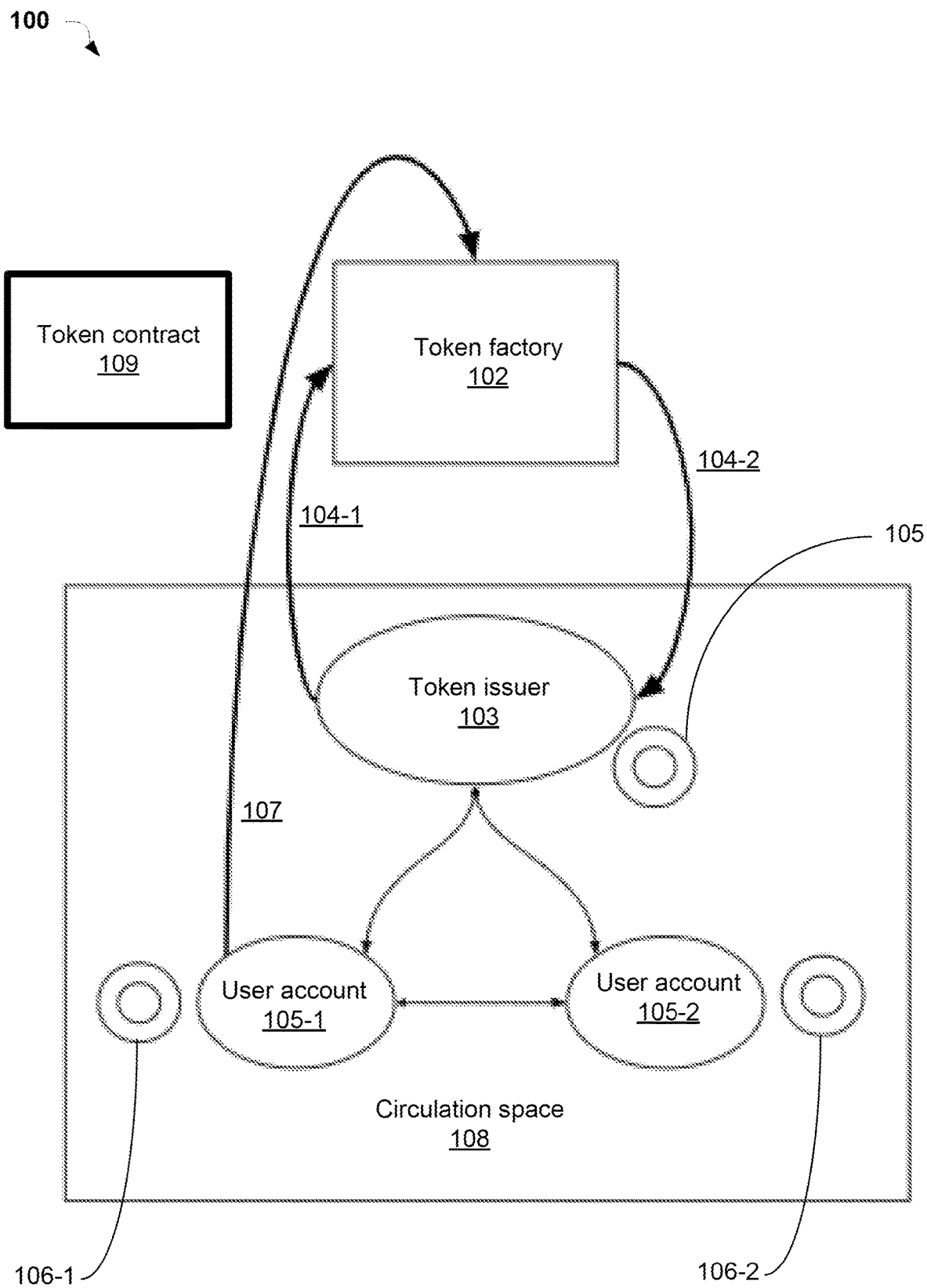
FIGS. 1A-1C are diagrams of example computer systems for implementing blockchain-based token attribution with reduced computational complexity, in accordance with some implementations.

Described herein are systems and methods implementing blockchain-based token attribution with reduced computational complexity. An asset generally refers to an object or property that is owned or controlled by an entity (e.g., an individual or a group of individuals), and can have a distinct usage right. For example, a physical asset refers to a tangible asset. As another example, a digital asset refers to an electronic asset (e.g., intangible asset).

A digital asset can be represented by a cryptographic token ("token"). One example of a token is a fungible token, in which the token is replaceable with other tokens of the same type and/or value. For example, a fungible token can represent a unit of value of a cryptocurrency (e.g., digital coin). Fungibility means that each unit of an asset, such as a token, is essentially identical and can be exchanged on a one-to-one basis with any other unit of the asset. Their fungible nature enables fungible tokens to be easily exchanged, traded and/or used within blockchain systems, decentralized applications (DApps), etc. Fungible tokens can be used to enable a variety of utility functions within a system, such as electronic transactions, electronic payments, electronic voting, etc.

In some implementations, a fungible token is a stablecoin. A stablecoin refers to a token that is designed to maintain an approximately stable value to minimize price fluctuations and to provide a more reliable store of value and medium of exchange within a network. For example, a stablecoin can be a fiat-backed stablecoin backed by fiat currency and pegged to the value of the underlying fiat currency. As another example, a stablecoin can be a commodity-backed stablecoin backed by a commodity and pegged to the value of the underlying commodity. As yet another example, a stablecoin can be a crypto-backed stablecoin backed by another digital asset, such as another fungible token. To do so, a user can deposit an amount of the other digital asset as collateral and stablecoins can be issued against this collateral. As yet another example, a stablecoin can be an algorithmic stablecoin that uses a stablecoin supply control mechanism that modifies stablecoin supply in response to market conditions to maintain price stability. The stablecoin supply control mechanism can use a smart contract to automatically modify stablecoin supply.

Generally, a smart contract is a sequence of executable instructions stored on a blockchain network that enables at least one function. The sequence of executable instructions specify one or more conditions to be verified and one or more actions to be performed should the conditions be successfully validated. A smart contract can be stored on a blockchain network. When a smart contract is deployed, it becomes part of the blockchain and is replicated and stored on all participating nodes within the blockchain network.

Another example of a token is a non-fungible token (NFT). In contrast to fungible tokens, an NFT represents a unique asset that is not interchangeable with another asset. An NFT can have distinct characteristics or properties that differ from other NFTs that define the uniqueness. For example, NFTs can represent things like digital art, digital collectibles, etc.

Yet another example of a token is a semi-fungible token (SFT), which is a token that combines properties of both a fungible token and a non-fungible token. Each token within a set of SFTs can have unique properties or attributes, distinguishing it from other tokens in the set of SFTs. However, tokens within the same set of SFTs are still considered interchangeable and can be exchanged on a one-to-one basis. Accordingly, SFTs introduce a level of variability among tokens that are otherwise fungible in nature.

A token issuer refers to an entity that has minted a token within a token transaction management system of a blockchain network. Generally, minting refers to the process of creating a token within a blockchain network and bringing the token into circulation. A transaction record of the creation of the token can be added to a blockchain of the blockchain network. For example, a token issuer can be an entity that has triggered (e.g., called) a mint function. In some implementations, the mint function is a function of a smart contract. For example, the smart contract can be implemented by a token factory of the token transaction management system. A mint function can be defined by a token standard supported by the blockchain network. For example, a set of arguments of a mint function can include an address of the token issuer who has triggered the mint function, and a number of tokens to be minted. Like any other blockchain-based transaction, a consensus protocol can be used by the nodes of a blockchain network to verify a mint transaction before the corresponding transaction record can be added to the blockchain. A token issuer can proceed to transfer tokens minted by the token issuer to other user accounts.

In some implementations, a token issuer is a stablecoin issuer. For example, a stablecoin issuer can mint stablecoins in exchange for assets received from user accounts (e.g., fiat-backed stablecoins, commodity-backed stablecoins or crypto-backed stablecoins). To maintain value stability, some stablecoins offer a promise or expectation that the coin can be redeemed at par upon request by a user account.

A token minted by token issuers of a token transaction management system of a blockchain network can be transferred to a user account or between user accounts. A token balance for a user account can be mapped to an address designated for a user account. For example, the address can be an address of a digital wallet. In some implementations, a token contract of the token transaction management system can maintain mappings of digital wallet addresses to respective token balances. The token contract can be stored on the blockchain of the blockchain network. For example, a token contract can be implemented as a smart contract. The token contract can be created by the entity hosting the token transaction management system. Possession of tokens by user accounts (e.g., associated with digital wallets) may be tracked and/or modified by one or more token contracts.

It may be desirable for the token transaction management system to use a token attribution method to keep track of the total number of tokens (e.g., stablecoins) minted by a token issuer across all user accounts within the token transaction management system. For example, the token attribution method can be implemented via a token contract. More specifically, as will be described in further detail herein below, a smart contract (e.g., implemented by the token factory) can assign a token issuer of the token transaction management system with an attribution property that will be linked to each token minted by the token issuer. Each token minted by the token issuer will have the attribution property assigned to the token issuer.

For example, it may be desirable for the token contract to use the token attribution method to provide yield to the token issuer. "Yield" refers to a reward (e.g., additional tokens, interest or fees) earned by a token issuer based on the number of tokens minted by the token issuer that are in circulation within a token transaction platform. For example, yield can be provided to a token issuer who has agreed to lend one or more tokens minted by the token issuer. The token issuer can receive yield based on an amount of time that the token is locked for lending. The amount of time can be a definite amount of time or an indefinite amount of time. One example of a token lending activity if liquidity mining, in which a token issuer deposits a token into a liquidity pool. Yield can be distributed proportionally to token issuers in accordance with their respective token contributions. Additionally, the longer that a token minted by a token issuer is in circulation, the greater the yield that the token issuer may be eligible to receive. Yield will no longer be provided to the token issuer after the token is redeemed and removed from circulation. Accordingly, yield functions as an incentive to token issuers to maximize token volume and circulation time.

However, some token attribution methods can be computationally expensive for a token transaction management system to implement in practice as the number of different token issuers increases within the system, due at least in part to space complexity. Space complexity refers to the amount of memory or storage space needed to solve a computational problem. For example, in a lossless token attribution method, a token transaction management system would need to, for each user account (e.g., digital wallet address), store a token balance that reflects a token attribution for each token issuer. The space complexity needed to store a token balance for each user account using a lossless token attribution method can be approximately linear with respect to the number of token issuers. To illustrate linear complexity, it may be possible for a user account to be in possession of 1,000 tokens, where each token is attributed to a different token issuer that minted the token. Accordingly, a lossless token attribution method may not be a computationally tractable token attribution solution as the number of different token issuers increases.

Aspects and implementations of the disclosure address the above and other deficiencies by providing technology that implements blockchain-based token attribution with reduced space complexity, as compared to lossless token attribution methods. A blockchain-based token attribution described herein can be referred to as a lossy token attribution method. For example, a token can be a fungible token (e.g., digital coin) minted by a token issuer within a token transaction management system ("system"). In some implementations, a token is a stablecoin.

A system described herein can support a mint function to enable a token issuer to mint a token and a redemption function to enable a user account to redeem an attributed token in its exchange for its underlying value. In some implementations, the mint function and the redemption function are functions implemented by a token factory. For example, the token factory can implement a first smart contract that includes the mint function and the redemption function. Further details regarding the mint function, the redemption function, the token factory, and the first smart contract will be described herein below.

As described above, a system described herein can assign a token minted by a token issuer with an attribution property that uniquely reflects the token issuer. A token assigned with an attribution property is referred to as an "attributed token." For example, the attribution property can be defined as token metadata (e.g., a metadata tag). In some implementations, attributed tokens are referred to as "colored tokens." A token that is not assigned with an attribution property identifying a particular token issuer is referred to as a "float token." As will be described in further detail below, float tokens can be generated as a byproduct of token transfer.

A system described herein can further implement a token contract that includes a transfer function to enable a sender user account ("sender") to transfer a set of tokens to a receiver user account ("receiver"). For example, the token contract can be implemented by a second smart contract. In some implementations, the first smart contract is different from the second smart contract. In some implementations, the first smart contract is the same as the second smart contract.

To implement a lossy token attribution method, at least one designated attribution property can be assigned to each user account (e.g., digital wallet address). For example, the token contract can maintain a record of designated attribution properties across user accounts within the system. In some implementations, a user account (e.g., owner of the digital wallet) selects the at least one designated attribution property assigned to the user account. In some implementations, the system (e.g., token contract) assigns at least one designated attribution property to a user account. For example, the system can randomly assign the at least one designated attribution property to the digital wallet. However, any suitable designated attribution property assignment method can be used in accordance with implementations described herein.

The token contract, via the transfer function, can control the transfer of tokens between a sender and a receiver. For example, the sender can send a transfer request to a token transaction platform. The transfer request can designate a total number of tokens and an address of the receiver (e.g., the digital wallet address of the receiver). The token transaction platform can be any node (e.g., server) of the system connected to the peer-to-peer (P2P) network of the underlying blockchain network to publish transactions. Upon receiving the transfer request, the token transaction platform can trigger the transfer function of the token contract. As will be described in further detail below, the transfer function can include a debit function that controls the number of attribution tokens and/or float tokens to be debited from the token balance of the sender to generate a transaction payload, and a credit function that adds the transaction payload to the token balance of the receiver. Any tokens within the transaction payload that do not have the at least one designated attribution property assigned to the receiver can be converted by the credit function into float tokens.

The lossy token attribution method can reduce the computational complexity and/or space complexity to implement a token transaction management system, as compared to a lossless token attribution method. That is, the space complexity to implement a token transaction management system using a lossy token attribution method can be sub-linear with respect to the number of token issuers. For example, the space complexity can be constant. A constant space complexity means that the amount of computing resources (e.g., memory) used to store a total token balance for a user account (including the at least one attributed token balance for the at least one designated attribution property and the float token balance) is the same regardless of the number of token issuers that have minted tokens within the system. This is because the number of individual token balances for a user account is bound by the number of designated attribution properties for the digital wallet (i.e., the number of designated attribution properties for the digital wallet plus one, where the "one" refers to float tokens). For example, by converting any attributed tokens received from a sender that do not have a designated attribution property for the receiver into float tokens, the number of individual token balances that need to be tracked by the system for the receiver's digital wallet is equal to the number of designated attribution properties plus one (corresponding to float tokens).

To illustrate, assume that a digital wallet has a single designated attribution property and has a total balance of 1,000 tokens. Further assume each of the 1,000 tokens can be minted by a different token issuer, such that only 1 token of the 1,000 tokens has the single designated attribution property. To keep track of token attribution using a lossless token attribution method in this illustrative example, as described above, the system would need to store, for each of the 1,000 different attribution properties, a token balance of 1 token (e.g., linear space complexity).

In contrast, to keep track of token attribution using a lossy token attribution method in this illustrative example, the system can store, for the digital wallet, an attributed token balance of 1 and a float token balance of 999, such that the total token balance is 1,000. That is, instead of storing, for each of the 1,000 attribution properties, a value representing the respective number of tokens having the attribution property, the system can simply store a value representing the number of tokens having the designated attribution property and a value representing the number of float tokens (i.e., tokens that do not have the designated attribution property). In this example, the space complexity is constant as there are only two types of values to track (i.e., the single designated attribution property and the float token). Accordingly, the lossy token attribution method can require fewer computational resources for tracking token balances than a lossless token attribution method, which can enable a greater number of token issuers to participate within the system with improved computational efficiency as compared to the lossless token attribution method.

Implementations described herein can provide a number of technical advantages. For example, as described above, by implementing blockchain-based token attribution using a lossy token attribution method described herein instead of a more computationally complex lossless token attribution method, implementations described herein can reduce resource consumption (e.g., processor and/or memory resource consumption).

Attributed tokens described herein can be used to enable a variety of practical applications in which it would be desirable to track, for each token issuer, the number of tokens in circulation minted by the token issuer. Examples of practical applications include yield provisioning, electronic loyalty programs, etc., as described above. For example, with respect to yield provisioning, a token issuer can lend a system with a number of tokens minted by the token issuer to increase token liquidity (e.g., liquidity pool). In return, the token issuer can receive yield based on the total number of tokens minted by the token issuer that are in circulation.

Various aspects of the above referenced methods and systems are described in further detail herein below by way of examples, rather than by way of limitation. Further details regarding implementing blockchain-based token attribution with reduced computational complexity will now be described in further detail below with reference to FIGS. 1A-8.

Figure 1B:
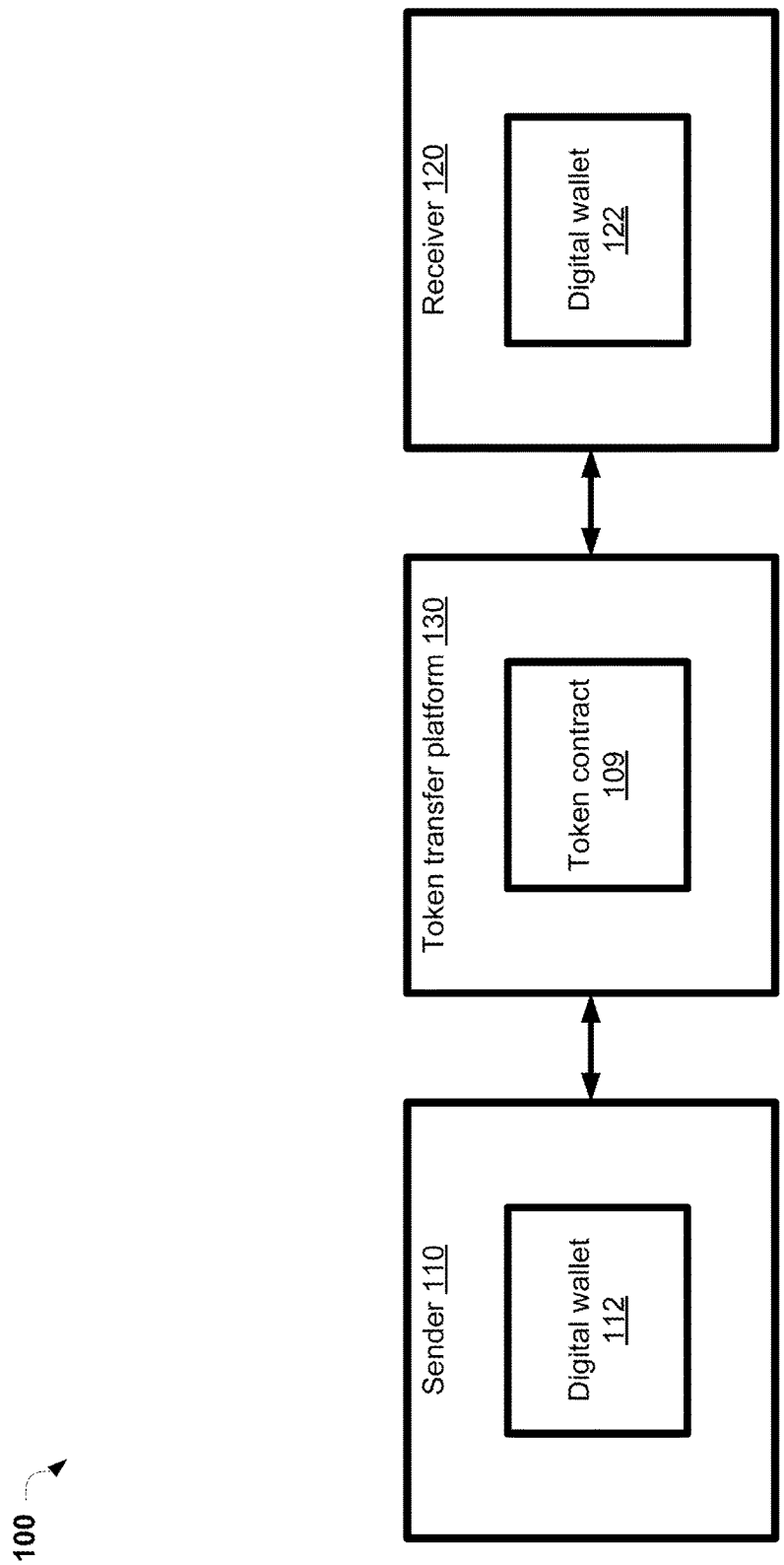
Figure 1C:
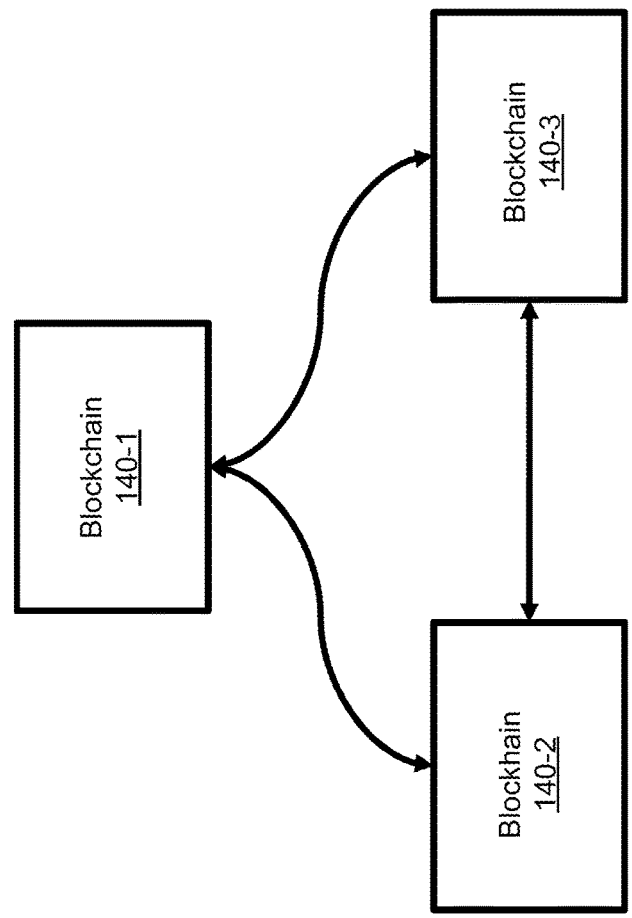

FIGS. 1A-1C are diagrams of example computer systems that can be used to implement blockchain-based token attribution with reduced computational complexity, in accordance with some implementations. For example, FIG. 1A shows system 100 including token factory 102 and a set of user accounts. Each user account of the set of user accounts can have an associated digital wallet linked to system 100.

Token factory 102 is a service (e.g., hardware and/or software component) that can support a set of functions that enables user accounts to create and/or manage tokens within a blockchain network. In some implementations, a token is a fungible token. For example, a token can be a stablecoin. Token factory 102 can implement a user interface that can receive inputs from a user account for executing one or more functions of the set of functions. Thus, the user interface can make token creation and/or management more accessible by reducing the amount of technical knowledge and/or programming skills needed to create and/or manage tokens. In some implementations, token factory 102 uses at least one smart contract to implement the set of functions. In some implementations, token factory 102 is a smart contract. As shown, system 100 can include at least one token issuer 103. Token factory 102 can be created by administrator of system 100.

For example, the set of functions can include a mint function that enables token issuer 103 to mint a set of attributed tokens. In some implementations, the set of attributed tokens is a set of fungible tokens. For example, the set of attributed tokens can be a set of stablecoins. A set of attributed tokens can include at least one attributed token having an attribution property referencing token issuer 103. More specifically, an attributed token is a token assigned with an attribution property that uniquely identifies the token issuer. For example, the attribution property can be defined as token metadata (e.g., a metadata tag). In some implementations, an attributed token is referred to as a colored token.

To initiate the mint function, token issuer 103 can interact with token factory 102 to trigger (e.g., call) the mint function, as indicated by arrow 104-1. For example, token issuer 103 can define a number of attributed tokens to be minted by the mint function. In some implementations, an argument of the mint function is a number of tokens to be minted, and the mint function outputs a number of attributed tokens having the attribution property assigned to token issuer 103. In response, the mint function can cause a set of attributed tokens including attributed token 105 to be minted and delivered to token issuer 103, as indicated by arrow 104-2. For example, delivering the set of attributed tokens including attributed token 105 to token issuer 103 can include mapping the set of attributed tokens including attributed token 105 to an address of a digital wallet owned by token issuer 103. Additionally, the mint function can increment the attribution token balance of attributed tokens having the attribution property.

As part of the minting process, the mint function can include a token assignment function that assigns, to each token that is minted, an attribution property identifying token issuer 103 (e.g., one-to-one mapping function). One example of a token assignment function is an incremental identifier mapping function, in which tokens minted by a first token issuer are assigned a first attribution property, tokens minted by a second token issuer are assigned a second attribution property, etc. However, any suitable token assignment function can be used in accordance with implementations described herein.

The set of user accounts can further include user account 105-1 and user account 105-2. Token issuer 103 can transfer attributed tokens to one or more additional user accounts (e.g., to one or more digital wallet address of the one or more additional user accounts). For example, as shown, at least one attributed token 106-1 has been transferred from token issuer 103 to user account 105-1, and at least one attributed token 106-2 has been transferred from token issuer 103 to user account 105-2.

System 100 can further include token contract 109. In some implementations, token contract 109 is a smart contract. In this example, token contract 109 is separate from token factory 102 (e.g., token factory 102 implements a different smart contract than token contract 109). In some implementations, token contract 109 is included in token factory 102, or vice versa (e.g., token factory 102 and token contract 109 implement the same smart contract). Token contract 109 can be created by administrator of system 100.

Token contract 109 can store token balances for user accounts including user account 105-1 and user account 105-2. For example, token contract 109 can store token balances for digital wallet addresses of digital wallets owned by the user accounts. Accordingly, instead of having the tokens being held in the digital wallets of the user accounts directly, the tokens of all user accounts can be held within token contract 109, where the token balances are mapped to respective user accounts via respective digital wallet addresses.

Additionally, token contract 109 can include a transfer function to enable transfer of tokens between user accounts (e.g., between digital wallet addresses). As will be described in further detail below with reference to FIG. 1B, system 100 can include a token transaction platform, and user account 105-1 that can interact with token contract 109 to trigger the transfer function to enable transfer of tokens between user accounts (e.g., between digital wallets). Further details regarding token transfer and token contract 109 will be described below with reference to FIG. 1B.

The set of functions implemented by token factory 102 can further include a redemption function that enables a user account of system 100 to redeem an attributed token for its underlying value. For example, for user account 105-1 to initiate the redemption function to redeem at least one attributed token (e.g., attributed token 160-1), user account 105-1 can interact with token factory to trigger (e.g., call) the redemption function, as indicated by arrow 107. User account 105-1 can define a set of attributed tokens as a redemption input for the redemption function. In some implementations, an argument of the redemption function is a redemption array. The redemption array can include one or more attribution properties and, for each attribution property, a respective redemption amount for the attribution property. For each attribution property of the set of attribution properties, the redemption function can update the attributed token balance for the attribution property by subtracting the redemption amount for the attribution property from the attributed token balance for the attribution property. In some implementations, an attributed token is redeemed by burning the attributed token. Any tokens that are minted are in circulation, as illustrated by circulation space 108. Redeeming an attributed token takes the attributed token out of circulation, which decrements the attributed token balance for attributed tokens having the attribution property.

Since a blockchain is immutable, a token cannot be deleted from existence within a blockchain network. Instead, to redeem a token, a "burn" operation can be performed to permanently remove the digital asset from circulation within a blockchain network. Burning can include transferring the token from the address of a source digital wallet to a special purpose digital wallet having a special purpose address (e.g., the null address), from which the digital asset cannot be transferred by future transactions. Thus, although a burned token still exists within the blockchain network, the burned token is inaccessible to digital wallets within the blockchain network. Burning a digital asset can involve payment of transaction fees. For example, a token can be burned by executing a set of executable instructions (e.g., a set of executable instructions of a smart contract). The set of executable instructions can include an instruction that, when executed, can determine whether there are sufficient funds in the digital wallet connected to the digital asset issuer. The set of executable instructions can further include an instruction that, when executed after determining that there are sufficient funds in the digital wallet, can transfer the digital asset to the special purpose digital wallet.

Various conditions can be imposed on minting and redemption to ensure accurate accounting of tokens. One condition is conservation of minting, in which the number of attributed tokens in circulation having an attribution property is less than or equal to the mint amount of attributed tokens having the attribution property. Otherwise, the total redemption amount can exceed the mint amount. Another condition is redemption parity, in which the total redemption amount of attributed tokens having an attribution property equals the total mint amount of attributed tokens having the attribution property. Otherwise, an attributed token can be in circulation forever. Further details regarding system 100 will now be described below with reference to FIG. 1B.

FIG. 1B is a diagram illustrating token transfer within system 100, in accordance with some implementations. As shown, system 100 includes sender 110 that owns digital wallet 112, receiver 120 that owns digital wallet 122, and token contract 109. As described above with reference to FIG. 1A, token contract 109 can maintain token balances for sender 110 and receiver 120. The token balance of sender 110 can be mapped to the address of digital wallet 112, and the token balance of receiver 120 can be mapped to the address of digital wallet 122.

Each token balance can include at least one attributed token balance and a float token balance. An attributed token balance reflects the number of attributed tokens having a particular attribution property (e.g., a number of colored tokens having a particular color), and the float token balance reflects the number float tokens. A digital wallet can have at least one designated attribution property, in which tokens that do not have the designated attribution property are stored as float tokens. In some implementations, a digital wallet has a single designated attribution property. In some implementations, a digital wallet has multiple designated attribution properties.

For example, the token balance within a digital wallet (e.g., digital wallet 112 or digital wallet 122) can be represented by M C|N, where C is an attribution property, M is the attributed token balance for attributed tokens having attribution property C, N is a float token balance, and the token balance is M+N. To illustrate, assume that an attribution property is token color. The token balance within a digital wallet can be represented by M C|N, where C is an attribution property (e.g., token color), M is the attributed token balance for attributed tokens having attribution property C, N is a float token balance, and the token balance is M+N. To illustrate, the token balance of a digital wallet with 7 attributed tokens having attribution property C and 3 float tokens can be represented by 7 C|3, and the token balance is 10. Although only a single attribution property C is shown in these examples, any number of attribution properties can be defined in accordance with implementations described herein (e.g., $M_1 C_1, M_2 C_2, \ldots, M_N C_N$). A designated attribution property (e.g., primary token color) can be designated for a user account (e.g., digital wallet).

A token in circulation (e.g., within circulation space 108 of FIG. 1A) can be transferred from sender 110 to receiver 120. In some implementations, sender 110 is a token issuer (e.g., token issuer 103 of FIG. 1A) and receiver 120 is another user account (e.g., user account 105-1 or 105-2 of FIG. 1A). In some implementations, sender 110 is a user account that transfers a set of tokens including at least one attributed token and/or at least one float token from digital wallet 112 to digital wallet 112. The user account that is now in possession of the token can then transfer, as a sender, the token from its digital wallet to a digital wallet of another user account as a receiver.

To enable token transfer, system 100 can further include token transaction platform ("platform") 130. Platform 130 can be any node (e.g., server) of the system connected to the P2P network of the underlying blockchain network to publish transactions. Sender 110 can send a transfer request to platform 130. The transfer request can designate a number of tokens (i.e., transfer amount) to be sent to receiver 120, and an address of receiver (e.g., the address of digital wallet 122). Upon receiving the transfer request from sender 110, platform 130 can trigger (e.g., call) a transfer function of token contract 109 to transfer the number of tokens to receiver 120. The transfer amount can include total number of tokens to be transferred.

To satisfy the transfer request, the transfer function of token contract 109 can determine how many attributed tokens to debit from the attributed token balance of sender 110 and/or how many float tokens to debit from the float token balance of sender 110. More specifically, the transfer function can include a debit function in which the transfer amount is debited from the token balance of sender 110 (e.g., the token balance of digital wallet 112) to obtain a transaction payload. For example, the debit function can utilize the float token balance of sender 110 before the attributed token balance of sender 110, and the transaction payload defines the number of debited attributed tokens and the number of debited float tokens. As an illustrative example, if sender 110 has a token balance of 7 B|3 (e.g., B is the color blue) and the transfer amount is 5, then the updated token balance of sender 110 is 7 B|3−5=5 B|0, the number of debited attributed tokens is 2, the number of debited float tokens is 3, and the transaction payload is 2 B|3.

To complete the transfer request, the transfer function of token contract 109 can further determine how to credit the tokens of the transaction payload to the token balance of receiver 120. More specifically, the transfer function can further include a credit function in which the transaction payload is credited to the token balance of receiver 120 (e.g., the token balance of digital wallet 122) to obtain an updated token balance of receiver 120.

As described above, at least one designated attribution property can be assigned to receiver 120 (e.g., the address of digital wallet 122). The operation of the credit function can change based on whether a designated attribution property assigned to receiver 120 is the same as the attribution property of attributed tokens of the transaction payload received from sender 110.

For example, if a designated attribution property assigned to receiver 120 is the same as the attribution property of attributed tokens of the transaction payload sent by sender 110, then the credit function can simply merge the transaction payload to the token balance of receiver 120. As an illustrative example, if the token balance of digital wallet 122 is 8 B|2 the transaction payload received from sender 110 is 2 B|3, then the updated token balance of digital wallet 122 becomes 8 B|2+2 B|3=10 B|5.

However, if a designated attribution property assigned to receiver 120 is not the same as the attribution property of attributed tokens of the transaction payload received from sender 110, then an attribution property selection strategy can be applied. Generally, applying an attribution property selection strategy includes converting a number of attributed tokens of the transaction payload that do not have the designated attribution property into a corresponding number of float tokens. Converting these attributed tokens to float tokens reduces the number of attribution properties of tokens that need to be tracked and stored by token contract 109 for receiver 120, which reduces computational complexity and/or space complexity.

Converting an attribution token having an attribution property into a float token decrements an attributed token balance for the attribution property within system 100. To ensure that a token issuer of an attributed token having an attribution property that is converted into a float token does not lose credit for minting the attributed token, a float token credit balance for the attribution property within system 100 can be incremented. The float token credit balance for an attribution property within system 100 is equal to the net amount of attributed tokens having the attribution property that have been converted into float tokens within system 100. That is, a total attributed token balance for an attribution property within system 100 can be defined as the sum of the attributed token balance for the attribution property and the float token balance for the attribution property within system 100.

An attributed token can be converted into a float token using a de-attribution function of transfer function 132. The argument of the de-attribution function can include the number of attributed tokens having a specified attribution property, and the de-attribution function can cause the corresponding number of float tokens to be output. The total number of float tokens (i.e., float amount) is a non-negative integer less than or equal to the mint amount. Thus, the number of attributed tokens defined by the input of the de-attribution function is a non-negative integer less than or equal to the mint amount. For example, the de-attribution function can be a wrap function that wraps an attributed token with a "float property" that converts the attributed token into a float token. In some implementations, wrapping an attributed token includes changing the attribution property of the attributed token to a float property. In some implementations, wrapping an attributed token includes locking the attributed token and minting a float token to replace the locked attributed token. For example, locking the attributed token can include sending the attributed token to a smart contract that holds the attributed token.

One attribution property selection strategy is a preferred attribution property strategy. In this strategy, receiver 120 designates a preferred attribution property, and all attributed tokens that are not assigned with the preferred attribution property are converted into float tokens.

Another attribution property selection strategy is a float minimization strategy. An objective of this strategy is to select an attribution property that minimizes the number of float tokens in circulation (e.g., the percentage of float tokens in circulation). In this strategy, if a number of first attributed tokens having a first attribution property within a transaction payload received from sender 110 is less than a number of second attributed tokens having a second attribution property of the token balance of receiver 120, then the first attributed tokens are converted into float tokens and added to the float token balance of receiver 120. Alternatively, if the number of first attributed tokens having a first attribution property within the transaction payload received from sender 110 is greater than the number of second attributed tokens having a second attribution property of the token balance of receiver 120, then the second attributed tokens are converted into float tokens and added to the float token balance of receiver 120. To illustrate the float minimization strategy, if the transaction payload is 5 B|5 and the token balance of digital wallet 122 is 7 G|0 (e.g., B is the color blue and G is the color green), then the 5 attributed tokens having attribution property B are converted to float tokens and the token balance of receiver 120 is updated to 7 G|10. As another example, if the transaction payload received from sender 110 is 5 B|5 and the token balance of receiver 120 is 3 G|0, then the 3 attributed tokens having attribution property G are converted to float tokens and the token balance of receiver 120 is updated to 5 B|8. The float minimization strategy can be generalized for a system including any suitable number of attribution properties. An illustrative example of converting attributed tokens into float tokens will be described below with reference to FIG. 7.

Conversely, a user account can similarly convert a number of float tokens into a corresponding number of attributed tokens having one or more attribution properties. A float token can be converted into an attributed token using an attribution function (e.g., a function of a smart contract). The argument of the attribution function can include the number of attributed tokens having a specified attribution property, and the attribution function can cause the corresponding number of attributed tokens having the specified attribution property to be output. The number of float tokens specified in the input is less than or equal to the float amount. For example, the attribution function can be an unwrap function that unwraps a float token. In some implementations, unwrapping a float token includes assigning an attribution property to the float token. For example, the attribution property can be a designated attribution property for the user account. In some implementations, unwrapping a float token includes unlocking a locked attributed token, and burning the float token.

A user account may need to convert a float token into an attributed token for various reasons. For example, converting a float token into an attributed token can improve token tracking within the system by reducing the total number of float tokens in circulation. As another example, since only attributed tokens can be redeemed to ensure accurate attributed token tracking, a user account can convert a float token into an attributed token in order to redeem the attributed token, as described above with reference to FIG. 1A. An illustrative example of converting float tokens into attributed tokens will be described below with reference to FIG. 7.

After conversion of a float token into an attributed token having an attribution property, an attributed token balance for that attribution property can be incremented and a float token credit balance for that attribution property can be decremented. This is done to keep track of the number of attributed tokens having the attribution property in circulation that have been minted by a token issuer.

Various mechanisms can be used by the attribution function to control float token conversion. In some implementations, the attribution function uses a random attribute selection mechanism to convert a number of float tokens into a corresponding number of attributed tokens. For example, a user account can send a request to convert a number of float tokens into a corresponding number of attributed tokens. Upon receiving the request, the attribution function can randomly select, for each float token, a corresponding attribution property to which to assign to the float token to generate a corresponding attributed token. Since redemption of an attributed token removes the token from circulation and thus removes the corresponding attribution for the particular token issuer, the random attribute selection mechanism can be used to achieve parity or fairness among token issuers.

For example, a user account can send a request to convert a number of float tokens into a corresponding number of attributed tokens having an attribution property that specifies the number of float tokens and the attribution property. Upon receiving the request, the attribution function can determine whether the request can be satisfied in full. For example, the attribution function can determine whether the request can be satisfied in full by determining whether the number of float tokens specified by the request is less than or equal to the float token credit balance for the attribution property specified by the request. If so, then each of the float tokens is converted into an attributed token having the specified attribution property. If not, then various options can be supported to handle the request. In some implementations, a maximum conversion option is used in which the number of float tokens converted into attributed tokens is equal to the float token credit balance. In some implementations, an "all-or-nothing" option is used in which either the entire request can be handled, or the request is denied.

In some implementations, digital wallet 112 is associated with a first blockchain and digital wallet 122 is associated with a second blockchain different from the first blockchain. Implementations described herein can support cross-chain transfers of tokens. To ensure accuracy in token tracking across different blockchains, the system can impose a restriction against cross-chain transfers of float tokens. Further details regarding cross-chain transfers will now be described below with reference to FIG. 1C.

FIG. 1C is a diagram of an example computer system ("system") 100C illustrating cross-chain transfer of tokens, in accordance with some implementations. As shown, system 100C can include multiple digital wallets including a digital wallet associated with a first blockchain ("blockchain 1") 140-1, a digital wallet associated with a second blockchain ("blockchain 2") 140-2, and a digital wallet associated with a third blockchain ("blockchain 3"). It is assumed in this example that each of the first blockchain, the second blockchain, and the third blockchain are all different blockchains. In some implementations, the first blockchain is a primary blockchain and the second and third blockchains are secondary blockchains. For example, the first blockchain can be a mainchain and the second and third blockchains can be sidechains. Although two secondary blockchains are described in this illustrative example, the number of secondary blockchains should not be considered limiting. Secondary blockchains can be used to improve the operation of a blockchain network, such as increase scalability and transaction speed. More specifically, secondary tasks can be offloaded to one or more secondary chains so that the primary chain can handle primary tasks (e.g., core tasks). Additionally, secondary blockchains can enable deployment of specialized applications and/or specialized smart contracts that may not be supported by the primary blockchain. For example, a secondary blockchain can be designed for privacy applications (e.g., confidential transactions), decentralized finance (DeFi) applications or gaming platforms. Accordingly, secondary blockchains can be used to improve blockchain network functionality and enable additional applications that may not be supported by the primary blockchain.

Attributed tokens can be transferred between blockchain 1 140-1 and blockchain 2 140-2, between blockchain 1 140-1 and blockchain 3 140-3, and/or between blockchain 2 140-2 and blockchain 3 140-3. Transferring an attributed token can include burning the attributed token with respect to the blockchain corresponding to the digital wallet from which the attributed token is being sent from, and minting the attributed token with respect to the blockchain corresponding to the digital wallet from which the attributed token is being received. No float tokens can be transferred during a cross-chain transfer, which effectively localizes float token tracking to each blockchain.

A "local supply" of an attribution property refers to the number of attributed tokens having the attribution property on a particular blockchain of the set of blockchains. A "total local supply" refers to the sum of the local supplies for each attribution property of a particular blockchain. A "global supply" of an attribution property refers to the sum of the local supplies of the attribution property across all blockchains of the set of blockchains. The term "total global supply" refers to the sum of the total local supplies across all blockchains of the set of blockchains. Blockchains 140-1 through 140-3 can each have a respective set of locally known attribution properties (LKAPs). For example, the set of LKAPs for blockchain 1 140-1 can include all attribution properties. As another example, the set of LKAPs for each of blockchains 140-2 and 140-3 can be a subset of all attribution properties of attributed tokens that have been received by the respective digital wallets.

A non-cross-chain transfer of an attributed token having an attribution property will not change any of the local supply of the attribution property, the total local supply, the global supply of the attribution property, or the total global supply. A cross-chain transfer of an attributed token having an attribution property will decrement both the local supply of the attribution property and the total local supply corresponding to the first blockchain and increment the local supply of the attribution property and the total local supply corresponding to the second blockchain. However, the cross-chain transfer, but will not change the global supply of the attribution property and/or the total global supply.

In some implementations, at least one of systems 100-100C is implemented by a decentralized exchange (DEX). A DEX, also known as a bridge, is a peer-to-peer (P2P electronic platform that facilitates token transfers between digital wallets connected to different blockchains (i.e., cross-chain swaps). For example, some bridges can utilize smart contract-governed consensus protocols to facilitate the automatic minting of digital assets on a blockchain.

Some bridges can suffer from a variety of drawbacks. For example, some existing bridges can rely on intermediary chains and protocol-specific tokens, such as intermediary tokens or wrapped tokens, to facilitate transactions. Only a protocol-specific token is minted on the blockchain as opposed to the actual digital asset that the user wants. The user must then exchange the protocol-specific token for the actual digital asset in an additional transaction. These additional transactions and use of protocol-specific tokens and intermediary chains introduce overhead in what should be a single seamless transaction. As another example, some existing bridges can support only a small, limited network of blockchains.

To address at least the above deficiencies, a token transaction platform described herein can be implemented using a set of cross-chain communication protocols ("communication protocols") to support trustless omnichain interoperability. A communication protocol can enable cross-chain communication of data items, such as messages or transactions, within a network. For example, a communication protocol described herein can support direct cross-chain messaging and/or cross-chain transactions. That is, a communication protocol described herein need not rely on any intermediary transactions, intermediary blockchains and/or intermediary tokens to facilitate the transmission of data items. A communication protocol described herein can be defined by a unified protocol, as opposed to an ad-hoc collection of messaging services, in order to serve diverse trust and security requirements of a wide variety of blockchain applications. A set of communication protocols described herein can provide a foundation to implement other network primitives, such as multicast (e.g., through iterated unicast) and/or publish/subscriber messaging.

Aspects and implementations of the set of communication protocols described herein can provide a number of technical advantages. For example, the set of communication protocols can enable the performance of direct cross-chain transactions. By using off-chain entities to retrieve and send transaction proofs and block headers, respectively, to a destination blockchain to determine whether a transaction originating from a source blockchain is stably committed on the source blockchain, the endpoints of the communication protocol located on the source blockchain and the destination blockchain can designed to be lightweight, and can run on computationally expensive blockchains without incurring prohibitive computational costs. Additionally, by enabling cross-chain digital asset transactions (e.g., transfers, swaps and/or exchanges), implementations described herein can maximize the utility of digital assets by enabling applications on every supported blockchain to use the digital asset, increase digital asset market liquidity, and digital asset utility. Further details regarding the set of communication protocols will now be described below with reference to FIGS. 2A-5D.

Figure 2A:
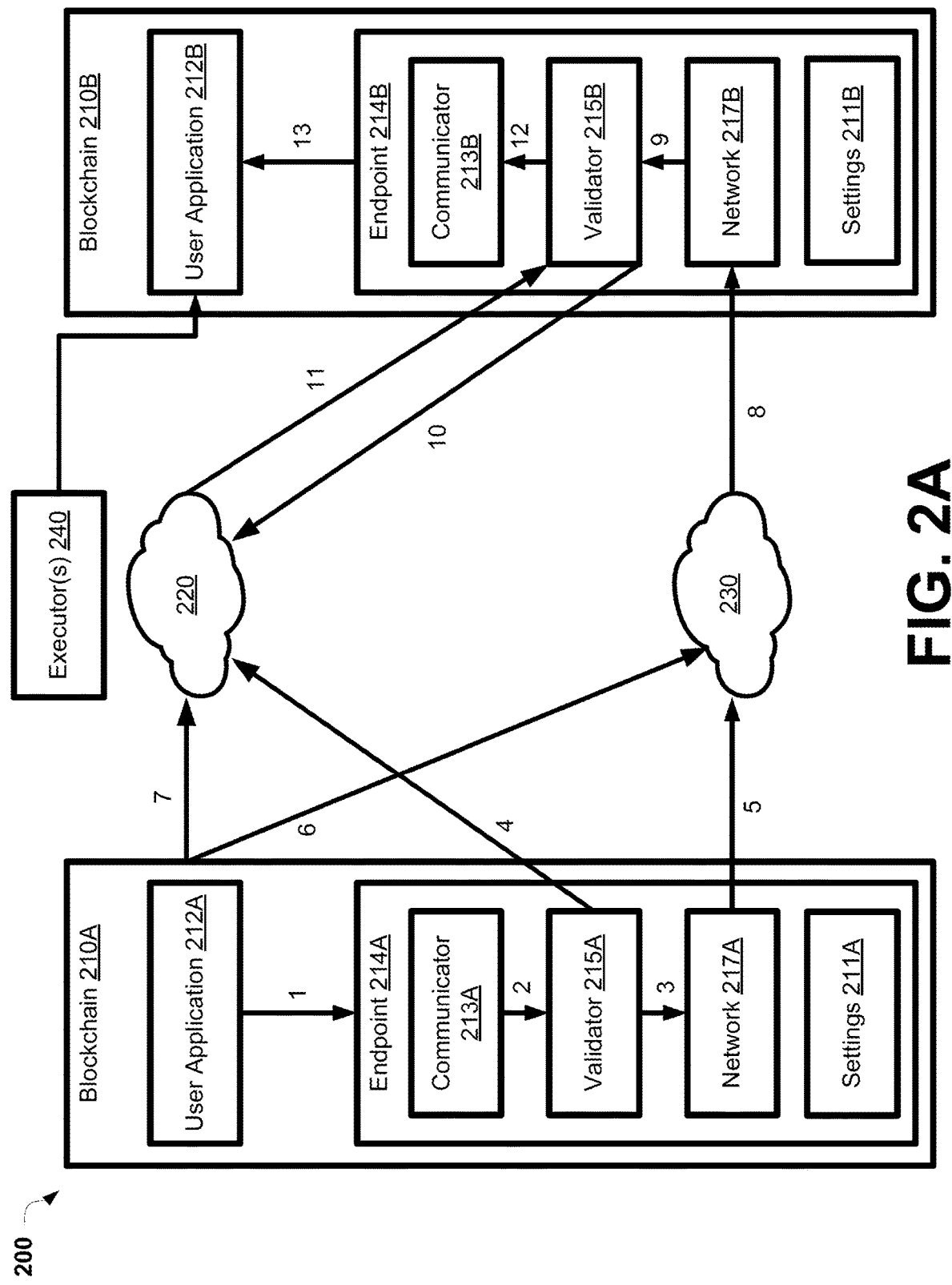
FIGS. 2A-2B are diagrams of an example computer system including a trustless omnichain interoperability protocol platform, in accordance with some implementations.
Figure 2B:
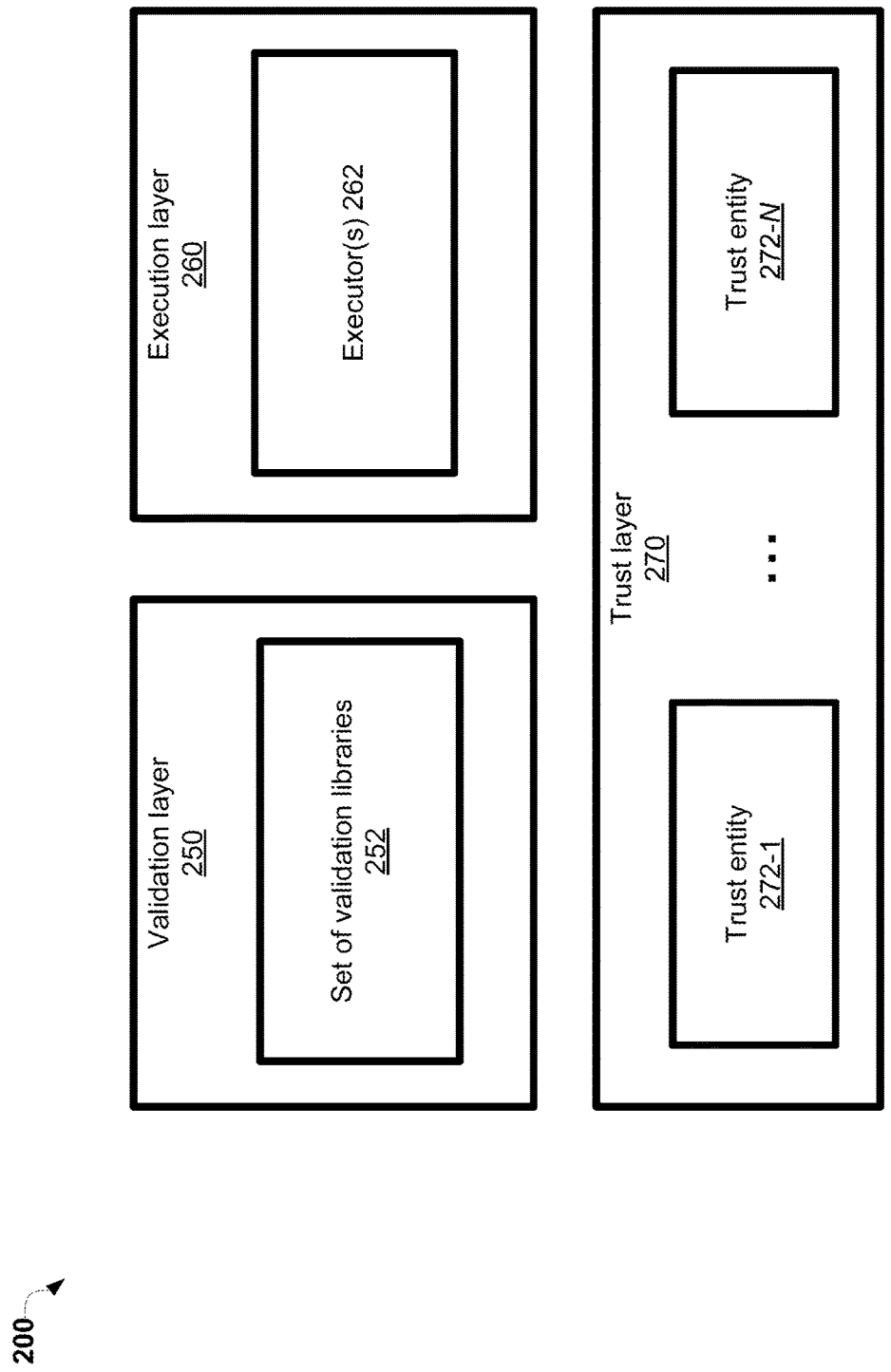

FIGS. 2A-2B are diagrams of an example computer system ("system") 200 including a trustless omnichain interoperability protocol platform, in accordance with some implementations. System 200 can implement a communication protocol to enable a cross-chain bridge ("bridge") that can be used to send a cross-chain data item (e.g., message or transaction) from source blockchain 210A to destination blockchain 210B of a network. For example, blockchain 210A can correspond to sender 110 of FIG. 1A, and blockchain 210B can correspond to receiver 120 of FIG. 1A.

More specifically, the data item can be sent from a node maintaining blockchain 210A to a node maintaining blockchain 210B. A network can refer to a collection of blockchains that have functionality to support a protocol implemented by a platform. Each node of a network can be connected to other nodes of the network via a pair of unidirectional "connections," over which data items (e.g., messages or native digital assets) can be transferred directly from the maintaining blockchain 210A to the node maintaining blockchain 210B. Each connection can be backed by liquidity assigned to blockchain 210B to facilitate withdrawals by the user as part of the communication protocol. Thus, the amount of available liquidity assigned to blockchain 210B can be viewed as the "bandwidth" of the connection between blockchain 210A and blockchain 210B. Allowing cross-chain transactions to flow freely provides opportunities for users to consolidate fragmented pockets of liquidity, while also making full use of applications on separate blockchains.

System 200 can enable a clean and minimal single-transaction cross-chain swap that does not utilize intermediary tokens. Generally, the transmission of a data item from blockchain 210A to blockchain 210B can be divided into multiple tasks, including an execution task and a validation task. A communication protocol described herein can separate these tasks into separate modules, which can then be unified through a flexible, customizable platform interface to support cross-chain data transfer protocols. For example, a platform interface can allow user applications associated with respective blockchains (e.g., located on the respective blockchains) to easily configure functionality, cost, and/or security. Accordingly, a communication protocol described herein can be generalized and modular to enable flexibility and customization depending on use case (e.g., a platform can define configuration space supporting a set of configurations).

For example, blockchain 210A can include or otherwise be associated with user application 212A and endpoint 214, and blockchain 210B can include or otherwise be associated with user application 212B and endpoint 214B. Endpoint 214A and endpoint 214B can enable a user to send and/or receive a data item using the communication protocol. In some implementations, endpoint 214A and endpoint 214B are each implemented as a smart contract or a series of smart contracts.

Endpoints 214A and 214B handle logic (e.g., high-level exchange logic) of the communication protocol for sending a data item from blockchain 210A to blockchain 210B. Endpoints, such as endpoint 214A and endpoint 214B, are lightweight clients that exist on their respective blockchains, and any blockchain with an endpoint can conduct cross-chain transactions involving any other blockchain with an endpoint using the platform. In some implementations, an endpoint is implemented as a series of smart contracts. Accordingly, the endpoints can create a fully-connected network in which every node of system 200 has a direct connection to every other node of system 200.

Endpoints 214A and 214B can appear to user applications 212A and 212B, respectively, as ordered channels between blockchains 210A and 210B. User applications 212A and 212B can interact via endpoints 214A and 214B, respectively, to implement a communication protocol. For example, endpoint 214A can receive a data item (e.g., message or transaction) to be sent to blockchain 210B (e.g., a user application located on the destination blockchain), and send the data item to blockchain 210B in accordance with the communication protocol. As another example, endpoint 214B can receive a data item sent by blockchain 210A in accordance with the communication protocol.

In some implementations, endpoint 214A includes set of communication protocol settings 211A, communicator component 213A, validator component 215A and network component 217A. In some implementations, endpoint 214B includes set of communication protocol settings 211B, communicator component 213B, validator component 215B and network component 217B. This design can enable the addition of support for new blockchains without modifying components 213A through 217A and/or components 213B through 217B.

Set of communication protocol settings 211A and set of communication protocol settings 211B can each include a validation library selected from a set of validation libraries supported by system 200. A validation library is responsible for enabling validation of a data item being sent from a source blockchain to a destination blockchain. Blockchains 210A and 210B can be configured with the same validation library to support the transmission of a data item in accordance with the communication protocol. For example, a validation library can be implemented as an auxiliary smart contract that defines how cross-chain communication should be handled in accordance with the communication protocol. Each validation library can have an associated version number. For example, the set of validation libraries can include multiple versions of at least one validation library. The set of libraries can include one or more libraries that can handle message (e.g., packet) generation, encoding and/or decoding of smart contract address information, computation involved in validating the transaction proof, etc. For example, a library can handle Merkle-Patricia tree validation. As another example, a library can be a zero-nonce proof library. User applications 212A and 212B can specify any version of a validation library to enable data item transmission for a particular use case. System 200 can provide the ability to swap new validation libraries to achieve particular implementations of the communication protocol. For example, user applications 212A and 212B can specify any version of a validation library to enable data item transmission for a particular use case. In some implementations, the validation library is selected based on risk tolerance. Further details regarding validation libraries will be described below with reference to FIG. 2B.

As another example, set of communication protocol settings 211A and set of communication protocol settings 211B can further include a selection of a set of off-chain entities to facilitate data transfer between blockchain 210A and blockchain 210B based on the selected validation library (e.g., as defined by the selected validation library). For example, the selected validation library can indicate the set of off-chain entities. A set of off-chain entities can include at least two entities that are guaranteed not to collude to enable trustless communication of a data item without the use of any intermediary chains, intermediary or wrapped tokens, etc. As shown, the set of off-chain entities includes trust entity 220, trust entity 230 and set of executors 240. In some implementations, the trust entity 220 and trust entity 230 are selected based on risk tolerance. More specifically, trust entity 220 and trust entity 230 are guaranteed not to collude, in order to enable trustless communication of data between blockchain 210A and blockchain 210B without any intermediary chains, wrapped tokens, etc. Set of communication protocol settings 211A and set of communication protocol settings 211B can be the same to implement the communication protocol between blockchain 210A and blockchain 210B (e.g., the same library). To ensure trustless valid delivery of a data item (e.g., message) sent from blockchain 210A to blockchain 210B using the communication protocol, there must not be any collusion between trust entity 220 and trust entity 230. To prevent collusion between trust entity 220 and trust entity 230, trust entity 220 and trust entity 230 can be independent entities. For example, at least one of trust entity 220 or trust entity 230 can be a third-party entity that is not affiliated with the platform. Further details regarding executors and trust entities will be described below with reference to FIG. 2B.

Endpoint 214A and endpoint 214B can initialize a communication protocol to communicate a data item during a cross-chain transaction. In some implementations, initializing the communication protocol includes configuring set of communication protocol settings 211A and set of communication protocol settings 211B, respectively. In some implementations, configuring set of communication protocol settings 211A and set of communication protocol settings 211B includes endpoint 214A receiving a customized settings configuration from user application 212A and endpoint 214B receiving the customized settings configuration from user 212B, and endpoint 214A and endpoint 214B configuring set of communication protocol settings 211A and set of communication protocol settings 211B, respectively, in accordance with the customized settings configuration. In some implementations, configuring set of communication protocol settings 211A and set of communication protocol settings 211B includes endpoint 214A and endpoint 214B each configuring set of communication protocol settings 211A and set of communication protocol settings 211B, respectively, in accordance with a default configuration provided by the platform. For example, this can happen if user application 212A and user application 212B select the default configuration, or if endpoint 214A and endpoint 214B do not receive a customized settings configuration from user application 212A and user application 212B, respectively. Accordingly, during initialization of the communication protocol, a set of communication protocol settings can be selected from a range of communication protocol settings with different sets of characteristics depending on the user applications 212A and 212B.

After the communication protocol is initialized, the data item to be sent in accordance with the set of communication protocol settings. To ensure valid delivery, a data item can be delivered if (e.g., if and only if) the transaction is determined to be valid (e.g., valid and committed). The set of communication protocol settings can be used to ensure that the transaction is valid. A description of the steps involved in the valid delivery of a data item using system 200 will now be described.

In this illustrative example, trust entity 220 is a transaction proof entity and that trust entity 230 is a block header entity. A transaction proof entity is a service that provides a mechanism to independently produce a transaction proof for a specified transaction. In some implementations, a transaction proof entity is a third-party service. In some implementations, a transaction proof entity is provided by the platform itself. A block header entity is a service that provides a mechanism to produce a block header from one blockchain and send the block header to another blockchain. The block header is a component of the current block that includes information about the current block (i.e., block metadata). For example, the block header can include at least one of: a timestamp, a digest of the current block (e.g., hash of the current block), a digest of the header of the previous block (e.g., hash of the header of the previous block), a cryptographic nonce value, a Merkle tree root, etc. In some implementations, a block header entity is a third-party service not affiliated with the platform. However, such an example should not be considered limiting. User application 212A can execute a series of actions as part of a transaction T uniquely identified by transaction identifier t. The format of transaction identifier t can vary depending on the type of blockchain 210A. A step included in transaction Tis the transmission of a data item over the communication protocol with a valid delivery condition on transaction T.

More particularly, at step 1, user application 212A can send a request including a set of parameters to communicator component 213A. In some implementations, the set of parameters includes transaction identifier t, a global identifier pointing to a smart contract on blockchain 210B ("dst"), and a user payload (e.g., any data that user application 212A wants to send to user application 212B). In some implementations, the set of parameters include a set of transaction proof entity arguments. The set of transaction proof entity arguments can include information (e.g., payment information) in the event that user application 212A wishes to use a reference transaction proof entity.

At step 2, communicator component 213A generates a data item, and sends the data item along with auxiliary information to validator component 215A. In some implementations, the data item is a message. For example, the data item can be a packet. In some implementations, the data item generated by communicator component 213A includes dst and the user payload. For example, the data item generated by communicator component 213 can be represented as a packet Packet(dst, user payload). In some implementations, the auxiliary information includes transaction identifier t and the set of transaction proof entity arguments.

At step 3, validator component 215A notifies network component 217A that the block header for the current block on blockchain 210A needs to be sent to blockchain 210B. For example, validator component 215A can send transaction identifier t and dst to network component 217A, and the receipt of transaction identifier t and dst is what notifies network component 217A that the block header for the current block on blockchain 210A needs to be sent to blockchain 210B.

At step 4, validator component 215A notifies transaction proof entity 220 that the transaction proof for transaction T needs to be retrieved (e.g., fetched) and sent to blockchain 210B. For example, validator component 215A can forward the data item and the auxiliary information to transaction proof entity 220, and the receipt of the data item and the auxiliary information is what notifies transaction proof entity 220 that the transaction proof for transaction T needs to be retrieved and sent to blockchain 210B.

At step 5, network component 217A notifies block header entity 230 to retrieve (e.g., fetch) the block header for the current block on blockchain 210A and send the block header to blockchain 210B. For example, network component 217A can sends dst and a block identifier (ID) of the current transaction to block header entity 230, and the receipt of dst and the block ID is what notifies block header entity 230 to retrieve the block header for the current block on blockchain 210A and send the block header to blockchain 210B.

At step 6, block header entity 230 reads the block header of the current block from blockchain 210A. At step 7, transaction proof entity 220 reads the transaction proof associated with transaction T (proof(t)) from blockchain 210A. Transaction proof entity 220 can further store proof(t) off-chain. In some implementations, step 6 and step 7 are performed asynchronously.

At step 8, block header entity 230 confirms that the current block of blockchain 210A is stably committed on blockchain 210A. The mechanism for confirming that the current block of blockchain 210A is stably committed on blockchain 210A varies per blockchain. In some implementations, confirming that the current block of blockchain 210A is stably committed on blockchain 210A includes determining that a number of block confirmations satisfies a threshold condition. For example, determining that a number of block confirmations satisfies a threshold condition can include determining that the number of block confirmations is greater than or equal to a threshold number of block confirmations. In some implementations, the threshold number of block confirmations is 15. After confirming that the current block of blockchain 210A is stably committed on blockchain 210A (e.g., determining that the number of block confirmations satisfies a threshold condition), block header entity 230 sends the blocker header to network component 217B.

At step 9, network component 217B sends a digest of the block header to validator component 215B. For example, the digest of the block header can be a hash of the block header. At step 10, validator component 215B sends the digest of the block header to transaction proof entity 220.

At step 11, upon receiving the digest of the block header, transaction proof entity 220 sends, to validator component 215B, a list of tuples that match the current block of blockchain 210A. More specifically, the list of tuples can be a list of any data item, transaction identifier t, proof(t) tuples that match the current block of blockchain 210A. In the event that multiple users simultaneously send data items between endpoints 214A and 214B, there may be multiple data items and associated transaction proofs within the same block.

At step 12, validator component 215B determines whether transaction T is valid. In some implementations, determining whether transaction T is valid includes determining whether transaction T is valid and committed. For example, validator component 217 can determine whether transaction T is valid by determining whether the received transaction proof matches the block header stored by network component 217B (i.e., the transaction proof and the block header are determined to be in agreement). If the received transaction proof and the block header do not match, then transaction T is determined to be invalid and/or uncommitted and the data item is discarded.

Otherwise, the data item (e.g., Packet (dst, user payload)) is sent to communicator component 213B. Since the transaction process matches the block header, the data item is sent with the guarantee that the transaction is stably committed on blockchain 210A. Then, at step 13, communicator component 213B sends the data item to user application 212B. Accordingly, due to the lack of collusion between the set of off-chain entities, the communication protocol can guarantee that a transaction with respect to blockchain 210B will be paired with a valid, committed transaction with respect to blockchain 210A without involving any indirect methods (e.g., intermediary chains and/or wrapped tokens).

Executing smart contracts on blockchains (e.g., layer 1 blockchains) can be cost prohibitive, especially as the amount of stored data increases. To solve this problem, the task of retrieving transaction proofs is delegated transaction proof entity 220 and the task of retrieving block headers is delegated to block header entity 230. Transaction proof entity 220 and block header entity 230 are off-chain entities that do not collude. This results in endpoint 214A and endpoint 214B being lightweight and cost effective, even on expensive blockchains. An example of a packet that can be used to implement the communication protocol will now be described in detail below with reference to FIG. 3.

Referring to FIG. 2B, system 200 can include a set of layers to support the sending and/or receiving of a data item in accordance with the communication protocol. For example, validation layer 250 handles cybersecurity operations. To do so, validation layer 250 can include set of validation libraries 252 to handle validating a data item to be sent by blockchain 210A, sending the data item to execution layer 260 and/or trust layer 270, validating the data item at blockchain 210B and/or transmitting the data item to blockchain 210B.

Each validation library of set of validation libraries 252 can implement a data item validation mechanism having an associated trust characteristic and/or cost characteristic. For example, each validation library of set of validation libraries 252 can implement a data item validation mechanism that conforms to an application programming interface (API) of the platform to establish a connection to an endpoint. This can allow the communication protocol to avoid the trap of validation lock-in. In some implementations, validation layer 250 is append-only. In some implementations, set of validation libraries 252 is an append-only registry of validation libraries. In some implementations, each validation library of set of validation libraries 252 is immutable. Set of validation libraries 252 can include one or more validation libraries that can handle message (e.g., packet) generation, encoding and/or decoding of smart contract address information, computation involved in validating the transaction proof, etc. For example, a validation library can handle Merkle-Patricia tree validation. As another example, a validation library can handle zero-nonce proof validation. Each validation library of set of validation libraries 252 can be identifiable through a unique validation library identifier (ID). In some implementations, the validation library ID is paired with a version (e.g., semantic version) of the validation library.

A validation library can be selected from set of validation libraries 252 to handle transmission of a data item (e.g., message) by blockchain 210A and/or receipt of the data item by blockchain 210B. For example, user application 212A and user application 212B can configure a validation library via endpoint 214A and endpoint 214B, respectively, as part of a set of configuration settings. The selection of the validation library can be based on a trust characteristic and/or a cost characteristic (e.g., based on much must trust and/or cost user application 212A and/or user application 212B is willing to tolerate for sending/receiving the data item). A data item can only be sent from blockchain 210A to blockchain 210B if blockchain 210A and the blockchain 210B each are configured with the same validation library (e.g., the same version of the same library). In some implementations, a validation library is accessed directly on-chain by address. User application 212A and user application 21B can each swap out a currently selected validation library for a new validation library.

Execution layer 260 can include set of executors 262 including one or more executors that can be used to implement one or more non-validation tasks. A non-validation task refers to any task that does not directly pertain to validation. Set of executors 262 can minimize responsibilities of validation layer 250 (e.g., responsibilities of set of validation layers 252) by enabling the separation of non-validation tasks from validation tasks. The separation of non-validation tasks from validation tasks enables improved flexibility without compromising security. Set of executors 262 can be implemented and/or deployed by any entity, and can perform any non-validation task so long as the non-validation task does not interfere with a validation task that is implemented by a validation library. In some implementations, set of executors 262 includes multiple executors that each implement one or more respective non-validation task. The operation and implementation of set of executors 262 can be democratized, allowing any entity to execute its own executor of set of executors 262, and by extension allowing any user application to add custom logic to be executed as part of the data item transaction. In some implementations, set of executors 262 implement a security mechanism to detect a malicious data item originating from blockchain 210A by inspecting data originating from blockchain 210A, filter the malicious data item and/or block the malicious data item from being sent to blockchain 210B. The security mechanism can be used to increase defense against potentially security vulnerabilities (e.g., exploits) due to, e.g., protocol-level exploits and/or application-level exploits (e.g., due to a bug in an application-level smart contract).

Trust layer 270 can include trust entity 272-1 through trust entity 272-N. A set of trust entities can be selected among trust entity 272-1 through trust entity 272-N to handle transmission of a data item from blockchain 210A to blockchain 210B in accordance with a communication protocol. The set of trust entities and the executor(s) of set of executors 262 can collectively form a set of off-chain entities. For example, a user application can configure the set of off-chain entities via an endpoint as part of a set of configuration settings. The selection of the set of off-chain entities, such as the set of trust entities, can be based on a trust characteristic and/or a cost characteristic (e.g., based on much must trust and/or cost user application 212A and/or user application 212B is willing to tolerate for sending/receiving the data item). To ensure trustless valid delivery of a data item sent from blockchain 210A to blockchain 210B using the communication protocol, there must not be any collusion between trust entities. To prevent collusion between trust entities, each trust entity of the set of trust entities can be an independent trust entity. For example, at least one trust entity of the set of trust entities can be a third-party entity that is not affiliated with the platform.

A high-level description of the operation of system 200 will now be described. User application 212A can send a set of parameters for transmission of a data item to endpoint 214A. In some implementations, the data item is a message. For example, the data item can be a packet. In some implementations, sending the set of parameters includes generating a request by encoding the set of parameters into the request, and sending the request to endpoint 212A.

In some implementations, the set of parameters includes a user payload and a set of auxiliary parameters. The user payload can include any data that user application 212A wants to send to user application 212B via the data item (e.g., message). The set of auxiliary parameters can include at least one of: a validation library, a version of the validation library, a nonce value, a source blockchain ID of blockchain 210A, a source blockchain address of blockchain 210A, an address of user application 212A, a destination blockchain ID of blockchain 210B, a destination blockchain address of blockchain 210B, an address of user application 212B, an address of each off-chain entity that is being selected, a message offset, a set of executor arguments, etc. The set of executor arguments can specify which executor(s)

of set of executors 262 to invoke and the arguments to pass during the invocation of the executor(s).

Upon receiving the set of parameters from user application 212A, endpoint 214A can forward the set of parameters to validation layer 250. Validation layer 250 can select, based on the set of parameters, a validation library from set of validation libraries 252 to handle transmission of the data item. The validation library can then generate a data item based on the set of parameters. In some implementations, the validation library emits a data item that encodes parameters for the set of off-chain entities identified from the set of parameters (e.g., executor(s) of set of executors 262 and off-chain entities selected from trust entity 272-1 through 272-N).

The validation library can send the data item to the set of off-chain entities identified from the set of parameters. The set of off-chain entities can cause the data item to be sent to blockchain 210B for validation using the corresponding validation library. Upon successful validation, the data item can be sent to endpoint 214B. Endpoint 214B can order data items received from the validation library located blockchain 210B, buffer data items that are received out-of-order, etc. The endpoint 214B can send, to user application 212B, the data item from the endpoint located on the destination blockchain. Additionally, set of executors 262 can execute any relevant actions based on the set of parameters, and send corresponding executor data items (e.g., executor messages) to user application 212B.

FIG. 3 is a diagram of an example layout of an endpoint message 300, in accordance with some implementations. For example, endpoint message 300 can be a packet. The format of endpoint message 300 can vary depending on the source blockchain (e.g., blockchain 210A of FIG. 2) and the destination blockchain (e.g., blockchain 210B of FIG. 2). As shown, endpoint message 300 can include routing information 310, and user payload 320 including user argument 322 sent by a user application (e.g., user application 212A of FIG. 2). In some implementations, routing information 310 includes blockchain ID 312 and address 314. Blockchain ID 312 is a unique identifier for a blockchain in the communication protocol system. Address 314 is an address of the recipient smart contract on the destination blockchain. For example, address 314 can have a size of 20 bytes.

A communication protocol described above with reference to FIGS. 1A-3 can be used to implement a cross-chain bridge that deals exclusively in native digital assets. Contrary to some bridge designs that issue wrapped tokens or go through intermediary sidechains, a bridge built using a communication protocol described herein to send data items between blockchains can have liquidity pools exist on both blockchains. A user can simply deposit a native digital asset in one liquidity pool and withdraw a native digital asset from another liquidity pool. The communication protocol can enable direct bridges (e.g., 1:1 pricing), automated market making (e.g., ab=k pricing), etc. The guarantee of trustless valid delivery that the communication protocol provides can enable a wide range of cross-chain applications.

For example, a communication protocol described above with reference to FIGS. 1A-3 can be used to implement a multi-chain yield aggregator. Yield aggregators typically operate within the confines of single-chain ecosystems. One key weakness of these single chain yield aggregation systems is that they cannot take advantage of any yield opportunities outside of their current ecosystem, potentially missing out on many of the best yields. Implementing a multi-chain yield aggregator with the communication protocol described above can allow for strategies that tap into the best opportunities across all ecosystems, increasing access to high-yield opportunities and enabling users to take advantage of market inefficiencies. A multi-chain yield aggregator would be strictly better than a single-chain yield aggregator. For example, in the worst case, the strategy would degrade to taking advantage of opportunities on only one blockchain, and in the best case it would have exponentially more opportunities to choose from.

As another example, a communication protocol described above with reference to FIGS. 1A-3 can be used to implement a multi-chain lending protocol. For example, the communication protocol can enable a lending protocol that would allow a user to keep an entire digital asset base in-place on one blockchain, lend out the digital asset base, and borrow directly from a different blockchain. This can eliminate intermediary costs such as bridge and swap fees.

The ability to perform direct cross-chain transactions as described above with reference to FIGS. 1A-3 can enable the development and use of complex cross-chain or inter-chain applications without sacrificing trustlessness or introducing complex intermediary chains and/or smart contracts. Examples of such cross-chain applications include cross-chain bridges, multi-chain yield aggregators, and cross-chain lending protocols. For example, using a communication protocol described herein, users can freely move liquidity between blockchains, allowing for a single pool of liquidity to take part in multiple decentralized finance (DeFi) applications across different blockchains and ecosystems without having to go through third-party systems or intermediary tokens and/or chains.

The configuration of the set of communication protocol settings, including the validation library and the set of off-chain entities, can be used to solve a variety of technical challenges. One technical challenge that can be solved is related to cybersecurity and trust in data item validation. A user application can require a level of trust for validating a data item that crosses through a set of off-chain entities. The level of trust can have an inherently reciprocal relation with the cost of validating the data item. For example, there may be a desire to pay a larger fee to minimize the level of trust required and, by extension the degree of risk, to transfer a large quantity of digital assets (e.g., tokens) from a source blockchain to a destination blockchain. To address this technical challenge, the set of communication protocol settings can enable trust-configurability for validating data items using the communication protocol. For example, the validation library and the set of off-chain can be selected to satisfy a trust characteristic and/or a cost characteristic for validating a data item being sent from a source blockchain to a destination blockchain for a user application.

Another technical challenge that can be solved is extensibility. Generally, user applications should be updated to continue to meet ever-changing demands of users. It can be important to extend support to new blockchains that are added to the network, validation mechanisms, and messaging primitives. Moreover, the communication protocol should allow optimizations to existing code (e.g., debugging) in a manner that precludes the possibility of compromising the cost and/or performance of existing applications.

To address extensibility, the modular design of the set of communication protocol settings including validation libraries can enable the communication protocol to be quickly and easily extended to include new blockchains of the network on demand. A validation library can be immutable when added to the set of validation libraries, which can be used to guarantee that user applications can use a given version of a given validation library without modifying and/or deprecating the underlying code. Moreover, an executor can be used to implement any non-validation tasks (e.g., a task that does not directly pertain to validation). For example, any non-validation task can be factored out of the validation library and handled by the executor, allowing for rapid development and deployment of features without going through rigorous auditing that may be required to introduce a new version of a validation library. The executor can be implemented and/or deployed by any entity, and can perform any non-validation task so long as the non-validation task does not interfere with a validation task that is implemented by the validation library. Accordingly, the set of validation libraries can provide a high degree of freedom in adding and/or upgrade features, and the executor can be leveraged to minimize validation library responsibilities.

Yet another technical challenge that can be solved is cybersecurity against protocol-level vulnerabilities and application-level vulnerabilities. A common theme in the blockchain ecosystem is that the security or trustworthiness of a smart contract is directly related to how long it has been in-use without being compromised. As such, it can be important for existing, well-established code to remain usable in an unmodified state indefinitely. In-place modification of existing code during updates can result in a loss of cybersecurity, which can be unacceptable for some user applications. To balance the need for backwards compatibility with the need to continually update and improve code, implementations described herein can enable validation libraries to be added or updated while also enabling user selection between a new improved validation library, or an older, well-established validation library. A validation library described herein can be append-only to protect user applications and/or associated users from silent modifications to the validation library. This append-only design of disallowing in-place updates for validation libraries is atypical of other communication protocols that support cross-chain data item transfers and, coupled with the application-specific validation library configuration, can enable improved cross-chain data transfer security. Moreover, the endpoints described herein can be immutable to prevent any entity, including the platform supporting the endpoints, from bypassing data item validation using validation libraries. While it may be theoretically possible for a user application to configure a malicious validation library, existing user applications that have already configured a specific validation library will be left unaffected by the malicious validation library. In addition, on-chain configuration changes can undergo a peer-review process and test period before they are deployed, reducing the likelihood that a user application can configure a malicious validation library in the first place. By allowing a high degree of configurability and democratizing the operation of the off-chain infrastructure, a platform described herein can provide improved cybersecurity and communication-protocol-level configurability. In addition, users can execute their own off-chain entities for relaying data items to connect to existing validation libraries to further control the required level of trust for respective user applications. Further, a platform described herein can provide an off-chain security mechanism to protect against application-level security vulnerabilities.

Figure 4:
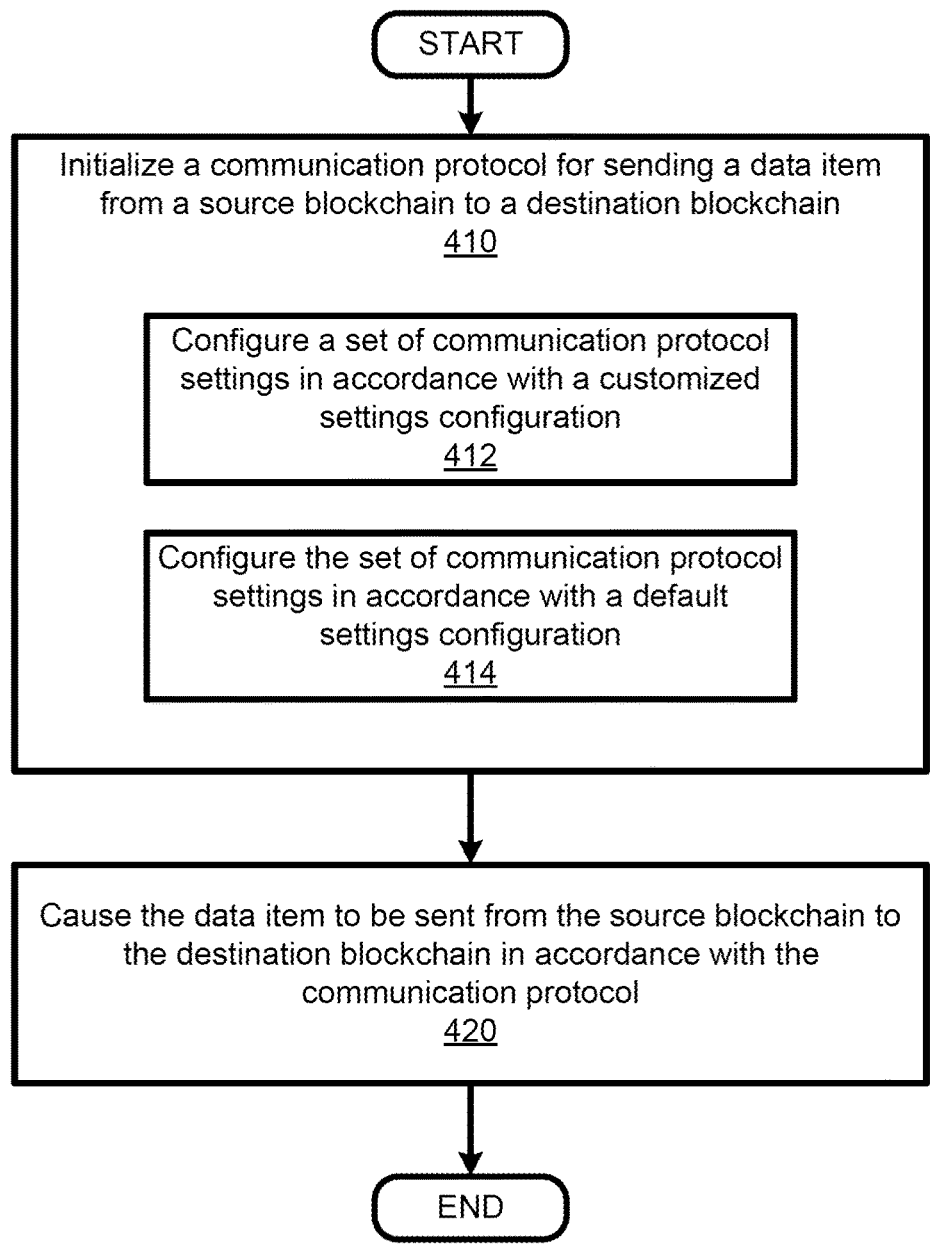
FIGS. 4-5D are flow diagrams of example methods for implementing trustless omnichain interoperability protocol platforms, in accordance with some implementations.

FIG. 4 depicts a flow diagram of an example method 400 for implementing a trustless omnichain interoperability protocol platform, in accordance with some implementations. For example, method 400 may be performed by endpoint 214A as shown in FIG. 2A. Method 400 may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 400.

At operation 410, processing logic initiates a communication protocol for sending a data item from a source blockchain supported by a platform to a destination blockchain supported by the platform. For example, the data item can be sent from a source node maintaining the source blockchain to a destination node maintaining the destination blockchain. In some implementations, the data item is a message. For example, the data item can be a packet.

Initializing the communication protocol can include configuring a set of communication protocol settings. In some implementations, the set of communication protocol settings includes a validation library selected from a set of validation libraries. For example, the set of validation libraries can include one or more validation libraries that are swappable (e.g., the validation library can be replaced with a new validation library). In some implementations, the set of communication protocol settings includes a set of off-chain entities selected to facilitate the sending of the data item. The set of off-chain entities can be selected in accordance with the validation library. For example, the set of off-chain entities can include a set of trust entities. A first trust entity of the set of trust entities does not collude with a second trust entity of the set of trust entities. The source blockchain and the destination blockchain are configured with at least some of the same set of communication protocol settings (e.g., the same validation library).

In some implementations, initializing the communication protocol includes, at operation 412, configuring a set of communication protocol settings in accordance with customized settings configuration. For example, configuring the set of communication protocol settings in accordance with the customized settings configuration can include receiving a customized settings configuration from a user application, and configuring the set of settings in accordance with the customized settings configuration received from the user application. The user application can be associated with source blockchain or the destination blockchain. The customized settings configuration can be received as part of a set of parameters associated with a data item to be transmitted from the source blockchain to the destination blockchain.

In some implementations, initializing the communication protocol includes, at operation 414, configuring the set of communication protocol settings in accordance with a default settings configuration. The default settings configuration can be provided by the platform. For example, this can happen if the user applications select the default configuration (e.g., as part of the set of parameters received from the user applications), or if the endpoints do not receive a customized settings configuration from the user applications.

In some implementations, initializing the communication protocol includes obtaining, from the user application, a set of parameters. In some implementations, obtaining the set of parameters includes receiving a request from the user application. For example, the request can be generated by encoding the set of parameters. In some implementations, the set of parameters includes a user payload and a set of auxiliary parameters. The user payload can include any data that the user application wants to send to the user application associated with the destination blockchain via the data item. The set of auxiliary parameters can include at least one of: a validation library, a version of the validation library, a nonce value, a source blockchain ID, a source blockchain address, an address of the user application, a destination blockchain ID, a destination blockchain address, an address of the user application associated with the destination blockchain, an address of each off-chain entity that is being selected, a message offset, a set of executor arguments, etc. The set of executor arguments can specify the set of executors and the arguments to pass during the invocation the set of executors.

At operation 420, processing logic causes the data item to be sent from the source blockchain to the destination blockchain in accordance with the communication protocol. For example, causing the data item to be sent in accordance with the communication protocol can include causing the data item to be sent in accordance with the set of communication protocol settings including the validation library and the set of off-chain entities. The set of trust entities of the set of off-chain entities can enable trustless valid delivery of the data item. The set of executors of the set of off-chain entities can implement non-validation tasks, which can enable separation of validation tasks implemented by the validation library from the non-validation tasks.

In some implementations, causing the data item to be sent from the source blockchain to the destination blockchain includes causing the validation layer to be selected from a set of validation layers. For example, causing the validation layer to be selected from the set of validation layers can include forwarding the set of parameters to a validation layer. The validation library can then generate the data item based on the set of parameters. In some implementations, the validation library emits a data item that encodes parameters for the set of off-chain entities identified from the set of parameters (e.g., set of executors and set of trust entities). The validation library can send the data item to the set of off-chain entities identified from the set of parameters. The set of trust entities can cause the data item to be sent to the corresponding validation library located on the destination blockchain. The validation library located on the destination blockchain can then attempt to validate the data item. Upon successful validation, the data item can be sent to the endpoint located on the destination blockchain. The endpoint located on the destination blockchain can order data items received from the validation library located on the destination blockchain, buffer data items that are received out-of-order, etc. The endpoint located on the destination blockchain can send, to the user application associated with the destination blockchain, the data item from the endpoint located on the destination blockchain. Additionally, the set of executors can execute any relevant actions based on the set of parameters, and send corresponding executor data items (e.g., executor messages) to the user application associated with the destination blockchain. Further details regarding operations 410-420 are described above with reference to FIGS. 2A-3.

An illustrative example of a method for implementing a trustless omnichain interoperability protocol platform (e.g., causing a message to be sent in accordance with the communication protocol) will now be described in further detail below with reference to FIGS. 5A-5D.

Figure 5A:
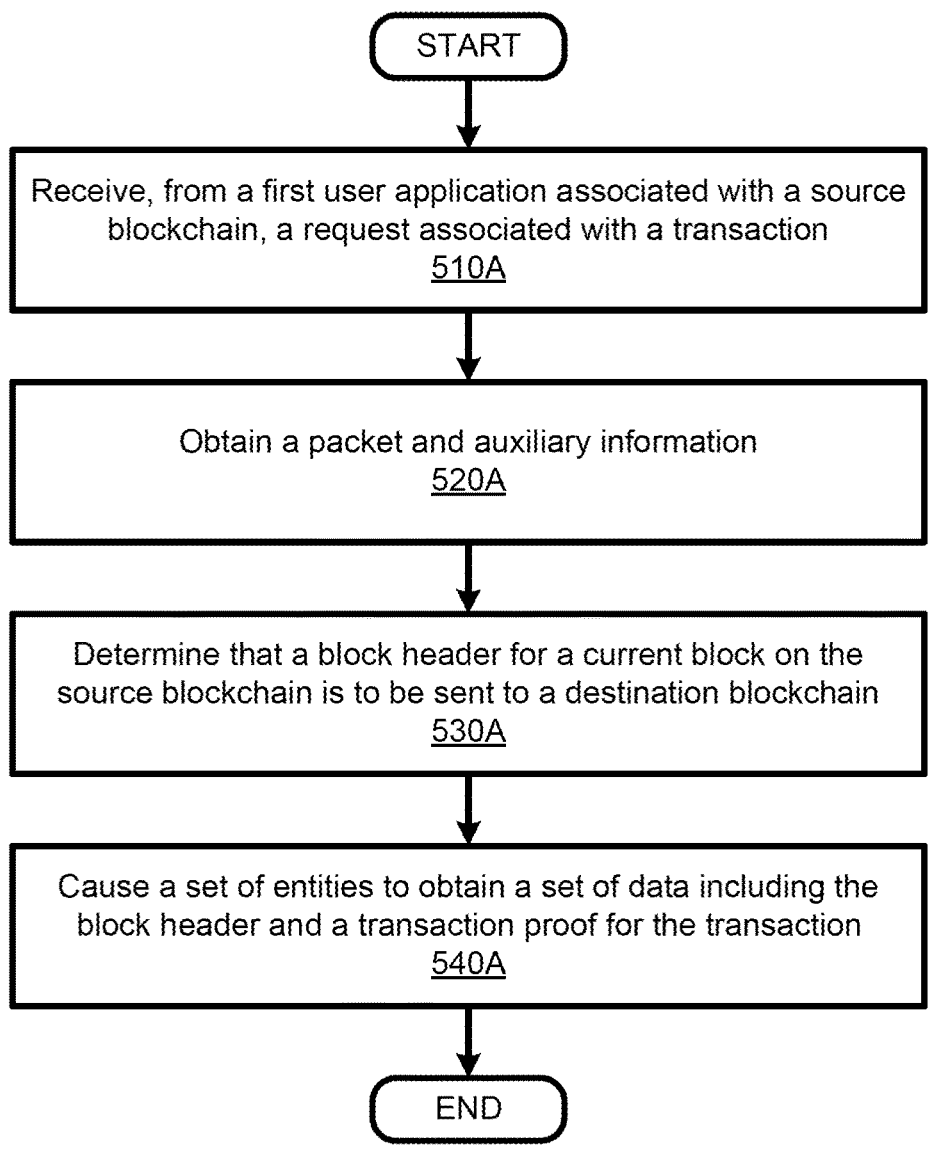

FIG. 5A depicts a flow diagram of an example method 500A for implementing a trustless omnichain interoperability protocol platform, in accordance with some implementations. For example, method 500A may be performed by endpoint 214A as shown in FIG. 2. Method 500A may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 500A.

At operation 510A, processing logic receives, from a first user application associated with a source blockchain, a request associated with a transaction. The source blockchain is maintained by a set of nodes of a first blockchain network. For example, the first user application can execute a series of actions as part of the transaction. The request can include a set of parameters.

In some implementations, the set of parameters includes a transaction identifier corresponding to the transaction, a global identifier corresponding to a destination blockchain, and a user payload. The format of the transaction identifier can vary depending on the source blockchain type. In some implementations, the global identifier is indicative of a smart contract on the destination blockchain. For example, the global identifier can point to the smart contract on the destination blockchain. The user payload can include any data that the user application wants to send to a second user application associated with the destination blockchain. In some implementations, the set of parameters further includes a set of transaction proof entity arguments. The set of transaction proof entity arguments can include information in the event that the first user application wishes to use a reference transaction proof entity.

At operation 520A, processing logic obtains a packet and auxiliary information. For example, obtaining the packet and auxiliary information can include generating the packet in response to receiving the request, and sending the packet with the auxiliary information for validation. In some implementations, the packet includes the global identifier and the user payload. In some implementations, the auxiliary information includes the transaction identifier and the set of transaction proof entity arguments.

At operation 530A, processing logic determines that a block header for a current block on the source blockchain is to be sent to a destination blockchain. The destination blockchain is different from the source blockchain and is maintained on a set of nodes of a second blockchain network different from the first blockchain network. For example, determining that the block header is to be sent to the destination blockchain can include receiving a notification that the block header needs to be sent to the destination blockchain. In some implementations, receiving the notification that the block header needs to be sent to the destination blockchain includes receiving the transaction identifier and the global identifier. For example, the transaction identifier and the global identifier can be validated prior to receiving the notification that the block header needs to be sent to the destination blockchain.

At operation 540A, processing logic causes a set of entities to obtain a set of data including the block header and a transaction proof for the transaction. For example, processing logic can cause the set of entities to obtain the set of data in response to determining that the block header is to be sent to the destination blockchain. In some implementations, the set of entities includes a transaction proof entity and a block header entity.

For example, causing the set of entities to obtain the set of data include the block header and the transaction proof can include notifying the transaction proof entity that the transaction proof needs to be retrieved (e.g., fetched) and sent to the destination blockchain. In some implementations, notifying the transaction proof entity that the transaction proof needs to be retrieved and sent to the destination blockchain includes sending the packet and the auxiliary information to the transaction proof entity, and the receipt of the packet and the auxiliary information is what notifies the transaction proof entity that the transaction proof needs to be retrieved and sent to the destination blockchain. Further details regarding the transaction proof entity are described above with reference to FIGS. 2A-2B and will be described below with reference to FIG. 5B.

As another example, causing the set of entities to obtain the set of data include the block header and the transaction proof can include notifying the block header entity that the block header needs to be retrieved (e.g., fetched) and sent to the destination blockchain. In some implementations, notifying the block header entity that the block header needs to be retrieved and sent to the destination blockchain includes sending the global identifier and a block ID to the block header entity, and the receipt of the global identifier and the block ID is what notifies the block header entity that the block header needs to be retrieved and sent to the destination blockchain. Further details regarding the block header entity are described above with reference to FIGS. 2A-2B and will be described below with reference to FIG. 5C.

As described above with reference to FIGS. 2A-2B and as will be described in further detail below with reference to FIG. 5D, an endpoint on the destination blockchain can receive the set of data including the block header and the transaction proof, and use the set of data to determine whether the transaction is valid. Upon determining that the transaction is valid, the endpoint on the destination blockchain can send the packet to the second user application. Further details regarding operations 510A-540A are described above with reference to FIGS. 2A-3 and will be described in further detail below with reference to FIGS. 5B-5D.

Figure 5B:
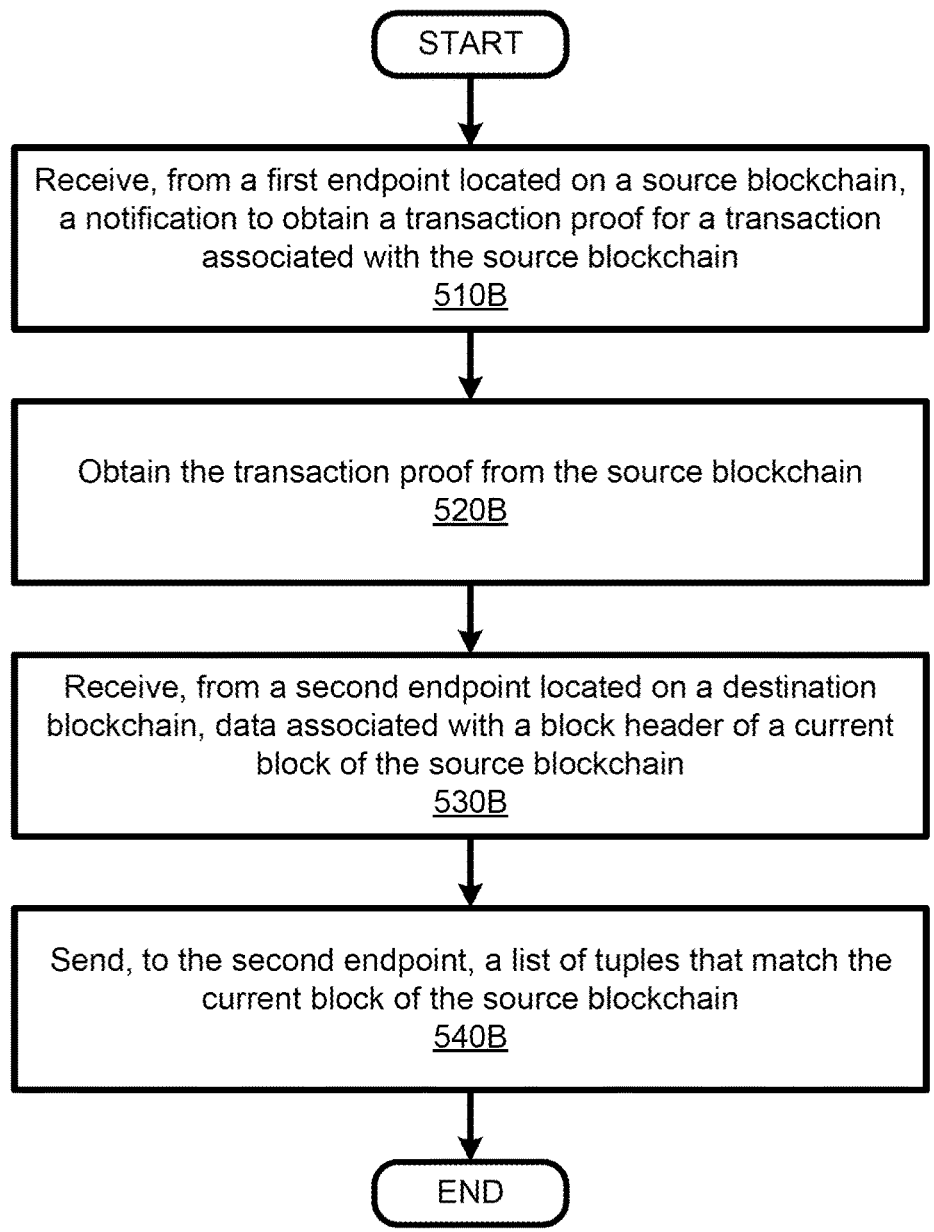

FIG. 5B depicts a flow diagram of an example method 500B for implementing a trustless omnichain interoperability protocol platform, in accordance with some implementations. For example, method 500B may be performed by transaction proof entity 220 as shown in FIG. 2A. Method 500B may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 500B.

At operation 510B, processing logic receives, from a first endpoint located on a source blockchain, a notification to obtain a transaction proof for a transaction associated with the source blockchain. In some implementations, receiving the notification to obtain the transaction proof includes receiving a packet and auxiliary information. In some implementations, the packet includes a global identifier corresponding to a destination blockchain and a user payload. In some implementations, the global identifier is indicative of a smart contract on the destination blockchain. For example, the global identifier can point to the smart contract on the destination blockchain. In some implementations, the user payload includes data that a first user application associated with the source blockchain wants to send to a second user application associated with the destination blockchain. In some implementations, the auxiliary information includes a transaction identifier of the transaction and a set of transaction proof entity arguments.

At operation 520B, processing logic obtains the transaction proof from the source blockchain. For example, the transaction proof can be obtained from the source blockchain in response to receiving the notification to obtain the transaction proof. In some implementations, obtaining the transaction proof from the source blockchain includes reading the transaction proof from the source blockchain. In some implementations, obtaining the transaction proof from the source blockchain further includes storing the transaction proof off-chain.

At operation 530B, processing logic receives, from a second endpoint located on a destination blockchain, data associated with a block header of a current block of the source blockchain. In some implementations, the data associated with the block header is a digest of the block header. For example, the data associated with the block header can be a hash of the block header.

At operation 540B, processing logic sends, to the second endpoint, a list of tuples that match the current block of the source blockchain. For example, the list of tuples can be sent to the second endpoint in response to receiving the data associated with the block header. More specifically, the list of tuples can be a list of any packet, transaction identifier, and transaction proof tuples that match the current block of the source blockchain.

As described above with reference to FIGS. 2A-2B and as will be described in further detail below with reference to FIG. 5D, the second endpoint can determine whether the transaction is valid based on the list of tuples. In response to determining that the transaction is valid, the second endpoint can send the packet to the second user application. Further details regarding operations 510B-540B are described above with reference to FIGS. 2A-5A and will be described in further detail below with reference to FIGS. 5C-5D.

Figure 5C:
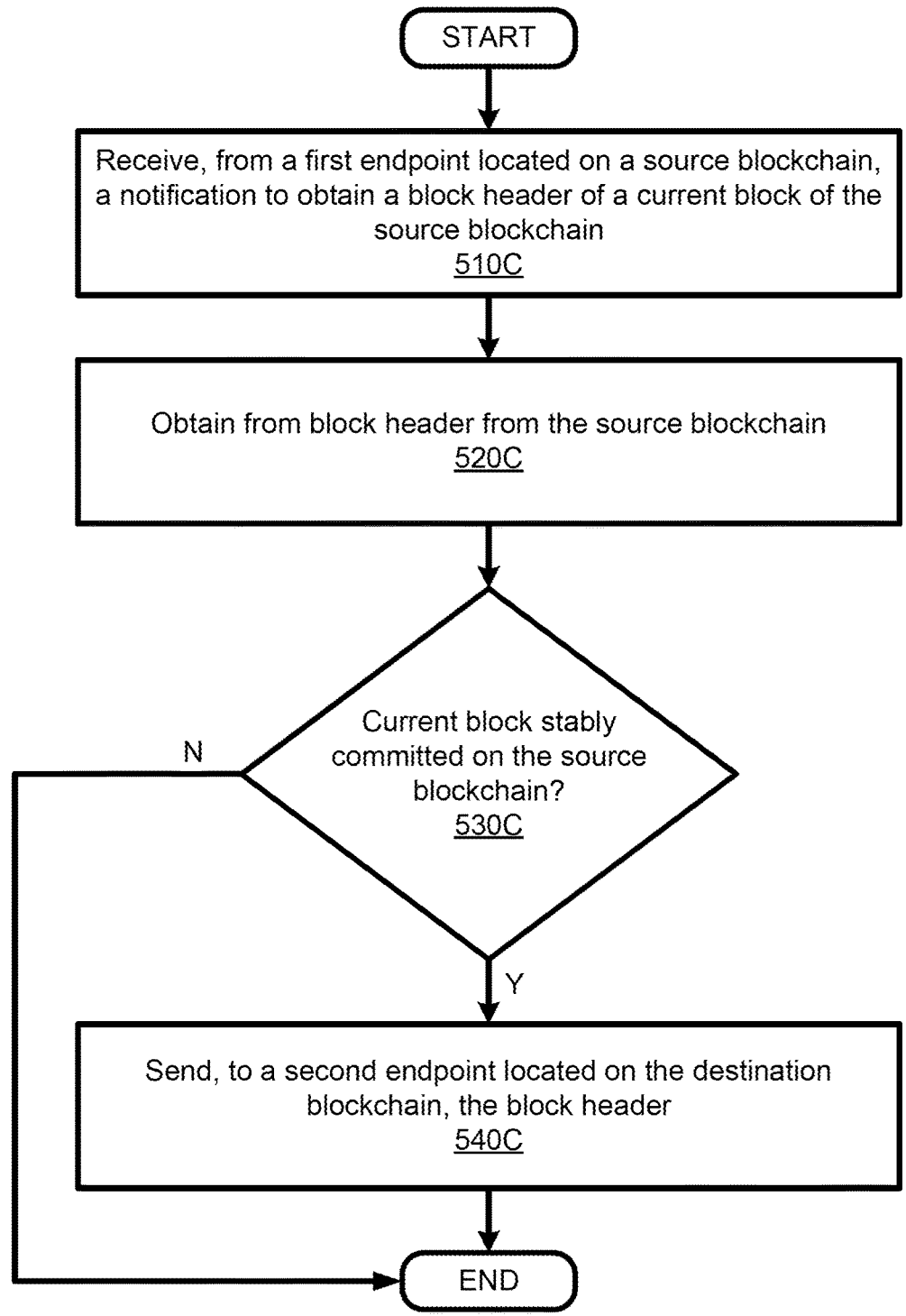

FIG. 5C depicts a flow diagram of an example method 500C for implementing a trustless omnichain interoperability protocol platform, in accordance with some implementations. For example, method 500C may be performed by block header entity 230 as shown in FIG. 2A. Method 500C may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 500C.

At operation 510C, processing logic receives, from a first endpoint located on a source blockchain, a notification to obtain a block header of a current block of the source blockchain. In some implementations, receiving the notification to obtain the block header includes receiving a global identifier corresponding to a destination blockchain and a block ID of the transaction. In some implementations, the global identifier is indicative of a smart contract on the destination blockchain. For example, the global identifier can point to the smart contract on the destination blockchain.

At operation 520C, processing logic obtains the block header from the source blockchain. For example, the block header can be obtained from the source blockchain in response to receiving the notification to obtain the block header. In some implementations, obtaining the block header from the source blockchain includes reading the block header from the source blockchain. In some implementations, obtaining the block header from the source blockchain further includes storing the block header off-chain.

At operation 530C, processing logic determines whether the current block is stably committed on the source blockchain. The mechanism for determining whether the current block is stably committed on the source blockchain varies per blockchain. In some implementations, determining whether the current block is stably committed on the source blockchain includes determining whether a number of block confirmations satisfies a threshold condition. For example, determining whether a number of block confirmations satisfies a threshold condition can include determining that the number of block confirmations is greater than or equal to a threshold number of block confirmations. In some implementations, the threshold number of block confirmations is 15.

In response to determining that the current block is stably committed on the source blockchain, at operation 540C, processing logic sends the block header to a second endpoint located on the destination blockchain.

As described above with reference to FIGS. 2A-2B and 5B and as will be described in further detail below with reference to FIG. 5D, the second endpoint can then generate data associated with the block header (e.g., a digest of the block header), and send the data associated with the block header to a transaction proof entity. The second endpoint can then receive, from the transaction proof entity, a list of tuples that match the current block of the source blockchain. The second endpoint can determine whether the transaction is valid based on the list of tuples. In response to determining that the transaction is valid, the second endpoint can send a packet to a user application associated with the destination blockchain. In some implementations, the packet includes the global identifier and a user payload. In some implementations, the user payload includes data that a user application associated with the source blockchain wants to send to the user application associated with the destination blockchain. Further details regarding operations 510C-540C are described above with reference to FIGS. 2A-5B and will be described in further detail below with reference to FIG. 5D.

Figure 5D:
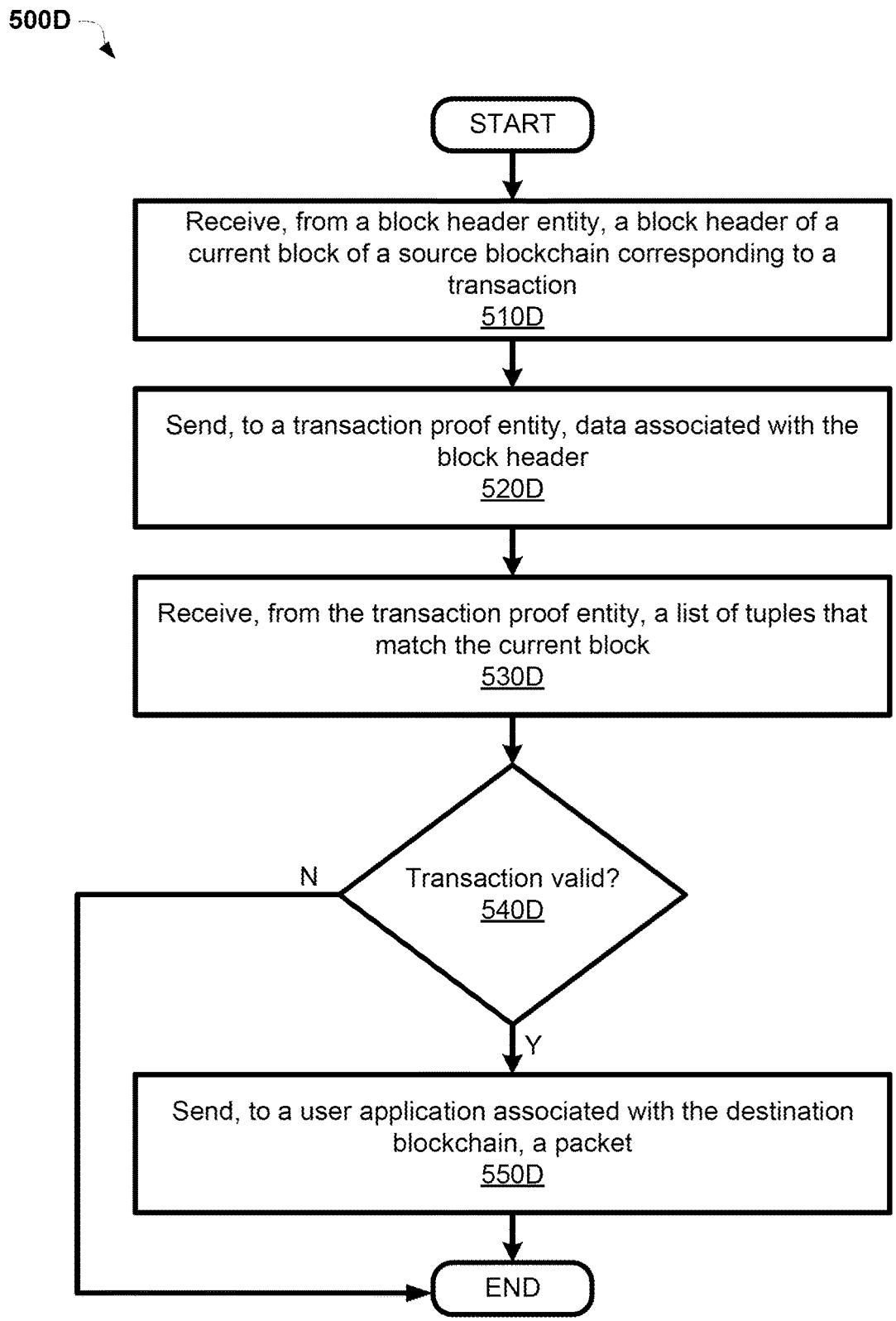

FIG. 5D depicts a flow diagram of an example method 500D for implementing a trustless omnichain interoperability protocol platform, in accordance with some implementations. For example, method 500D may be performed by endpoint 214B as shown in FIG. 2A. Method 500D may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 500D.

At operation 510D, processing logic receives, from a block header entity, a block header of a current block of a source blockchain corresponding to a transaction. For example, as described above with reference to FIGS. 2 and 5C, the block header entity can obtain the block header from the source blockchain (e.g., read the block header from the source blockchain).

At operation 520D, processing logic sends data associated with the block header to a transaction proof entity. To ensure trustless valid delivery, it is assumed that the block header entity and the transaction proof entity are off-chain entities that do not collude. In some implementations, sending the data associated with the block header to the transaction proof entity includes generating the data associated with the block header in response to receiving the block header. In some implementations, the data associated with the block header includes a digest of the block header. For example, the data associated with the block header can include a hash of the block header.

At operation 530D, processing logic receives, from the transaction proof entity, a list of tuples that match the current block. For example, the list of tuples can be sent by the transaction proof entity in response to receiving the data associated with the block header. In some implementations, the list of tuples includes at least one tuple of a packet, a transaction identifier corresponding to the transaction, and a transaction proof of the transaction, that matches the current block. In some implementations, a packet of a tuple is a packet including a global identifier corresponding to a destination blockchain and a user payload. In some implementations, the global identifier is indicative of a smart contract on the destination blockchain. For example, the global identifier can point to the smart contract on the destination blockchain. In some implementations, the user payload includes data that a user application associated with the source blockchain wants to send to the user application associated with the destination blockchain.

In some implementations, the list of tuples includes zero tuples of a packet, a transaction identifier corresponding to the transaction, and a transaction proof of the transaction, that matches the current block. In this case, the transaction cannot be validated and the process would end.

At operation 540D, processing logic determines whether the transaction is valid based on the list of tuples. In some implementations, determining whether the transaction is valid includes determining whether the transaction is valid and committed. In some implementations, determining whether the transaction is valid includes determining whether the block header and the transaction proof match. In response to determining that the transaction is invalid (e.g., in response to determining that the block header and the transaction proof do not match), the process terminates.

In response to determining that the transaction is valid (e.g., in response to determining that the block header and the transaction proof match), at operation 550D, processing logic sends a packet to a user application associated with the destination blockchain. In some implementations, the packet includes the global identifier and the user payload. Further details regarding operations 510D-550D are described above with reference to FIGS. 2A-5C.

Figure 6A:
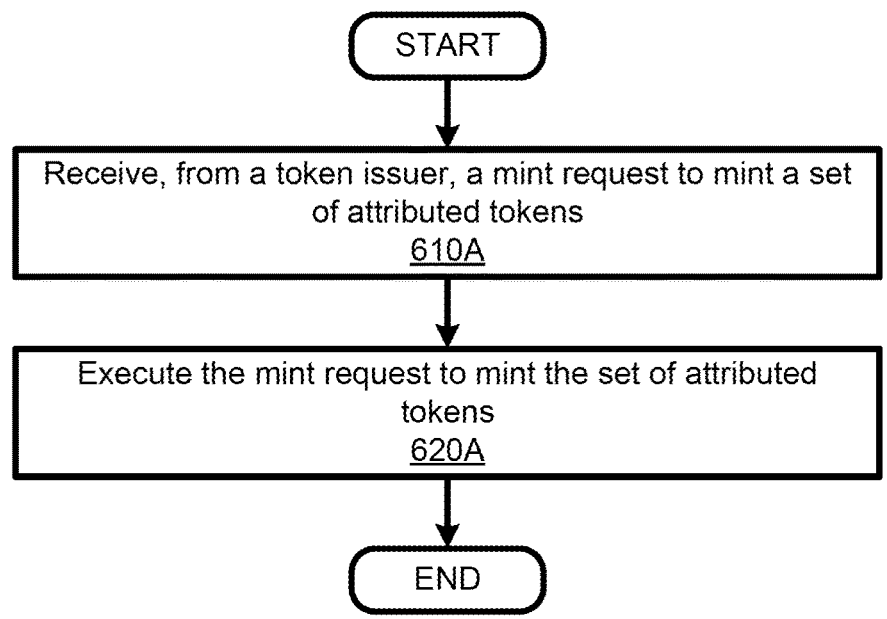
FIGS. 6A-6C are flow diagrams of example methods for implementing blockchain-based token attribution with reduced computational complexity, in accordance with some implementations.

FIG. 6A depicts a flow diagram of an example method 600A implementing a mint function, in accordance with some implementations. For example, method 600A may be performed by token factory 102 as shown in FIG. 1A. Method 600A may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 600A.

At operation 610A, processing logic receives, from a token issuer, a mint request to mint a set of attributed tokens and, at operation 620A, processing logic executes the mint request to mint the set of attributed tokens. Executing the mint request can include sending the set of attributed tokens to the token issuer (e.g., updating a token balance of the token issuer maintained by a token contract). For example, the mint request can define a number of tokens having an attribution property corresponding to the token issuer, and mint the number of tokens defined by the mint request using the mint function in response to receiving the mint request.

The token minter can be required to provide minting collateral for the minting in order to execute the mint request. Further details regarding operations 610A-620A are described above with reference to FIG. 1A.

Figure 6B:
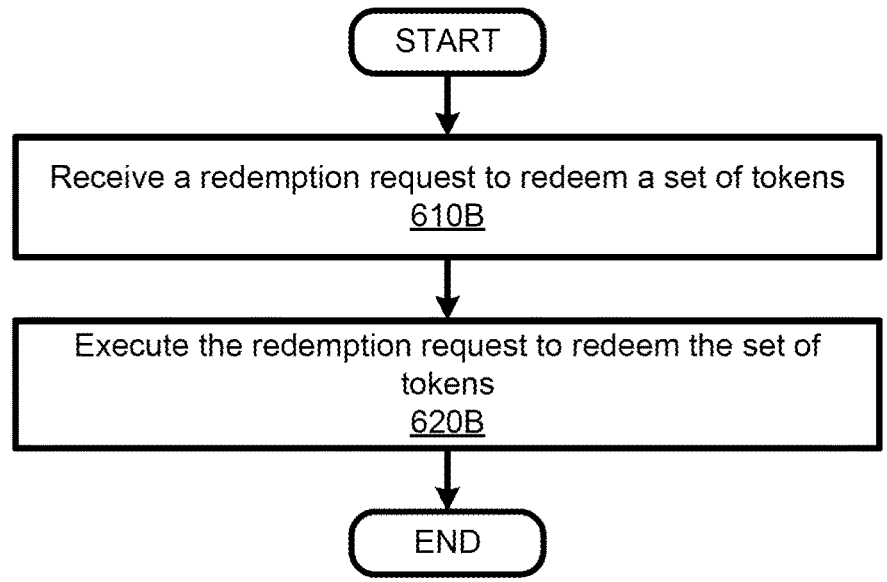

FIG. 6B depicts a flow diagram of an example method 600B for implementing a redemption function, in accordance with some implementations. For example, method 600B may be performed by token factory 102 as shown in FIG. 1A. Method 600B may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 600B.

At operation 610B, processing logic receives a redemption request to redeem a set of tokens and, at operation 620B, processing logic redeems the set of tokens. For example, a redemption request can be received from a user account to redeem a set of tokens in possession of the user account. In some implementations, redeeming the set of tokens is performed by converting an input of the request defining a set of attributed tokens into a redemption array. The redemption array can include a set of attribution properties including one or more distinct token attribution properties (e.g., a set of token colors) and, for each attribution property of the set of attribution properties, a respective redemption amount for the attribution property. Redeeming the set of tokens can include, for each attribution property of the set of attribution properties, subtracting the redemption amount for the attribution property from the mint amount for the attribution property to update the mint amount of the attribution property. Upon redemption of an attributed token, the attributed token is removed from circulation.

A user account can similarly convert a number of float tokens into a corresponding number of attributed tokens (e.g., colored tokens). A float token can be converted into an attributed token using an attribution function (e.g., of a smart contract). For example, the attribution function can be an unwrap function. The attribution function can receive an input defining a number of float tokens and a specified attribution property, and output the corresponding number of attributed tokens having the specified attribution property. The number of float tokens specified in the input is less than or equal to the float amount. After conversion of a float token into an attributed token having an attribution property, an attributed token balance for that attribution property can be incremented and a float token credit balance for that attribution property can be decremented. This is done to keep track of the number of attributed tokens having the attribution property in circulation that have been minted by a token issuer.

A user account may need to convert a float token into an attributed token for various reasons. For example, converting a float token into an attributed token can improve token tracking within the system by reducing the total number of float tokens in circulation. As another example, since only attributed tokens can be redeemed to ensure accurate attributed token tracking, a user account can convert a float token into an attributed token in order to redeem the attributed token. Further details regarding operations 610B-620B are described above with reference to FIG. 1A.

Figure 6C:
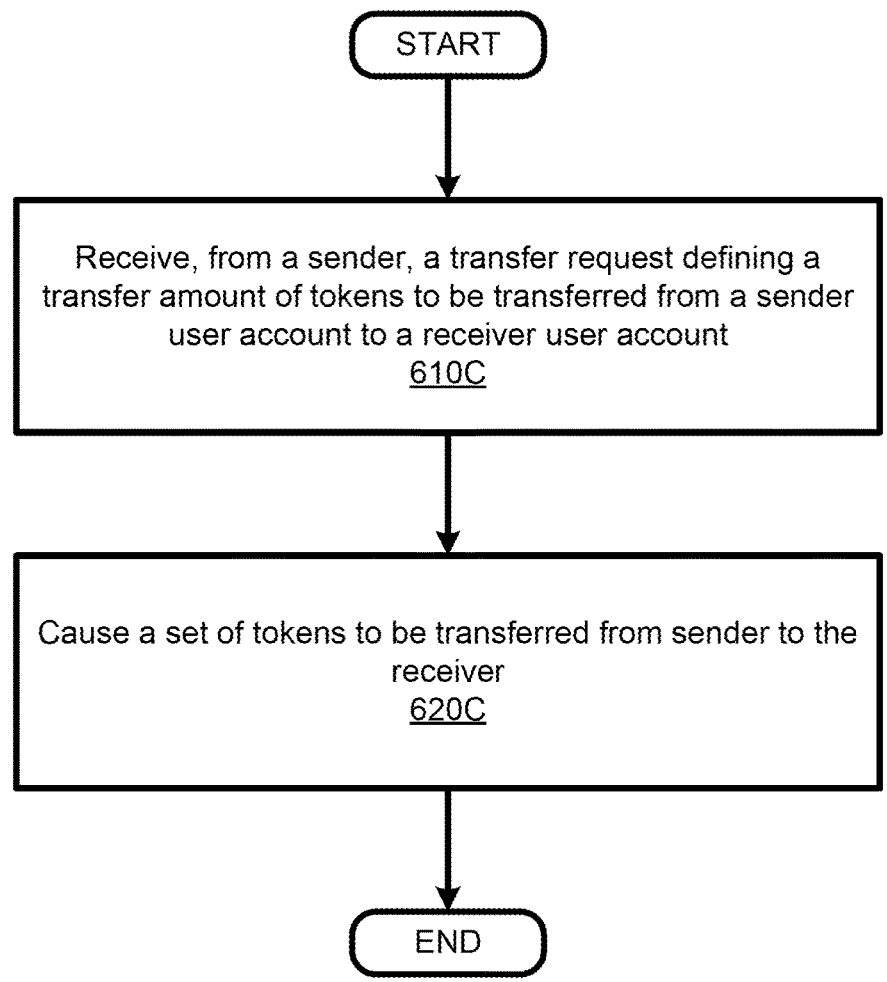

FIG. 6C depicts a flow diagram of an example method 600C to implement a transfer function, in accordance with some implementations. For example, method 600C may be performed by platform 130 as shown in FIG. 1B. Method 600C may be performed by one or more processing devices that may comprise hardware (e.g., circuitry, dedicated logic, programmable logic, microcode, etc.), executable code (such as is run on a general-purpose computer system or a dedicated machine), or a combination of both. For example, the one or more processing devices can perform individual functions, routines, subroutines, or operations to implement method 600C.

At operation 610C, processing logic receives a transfer request defining a transfer amount of tokens to be transferred from sender user account ("sender") to a receiver user account ("receiver"). The transfer request can include the transfer amount and an address of the receiver (e.g., address of a digital wallet owned by the receiver). In some implementations, the first and second digital wallets are associated with the same blockchain. In some implementations, the first digital wallet is associated with a first blockchain and the second digital wallet is associated with a second blockchain different from the first blockchain. For example, the first blockchain can be a primary blockchain of a blockchain network (e.g., a mainchain) and the second blockchain can be a secondary blockchain of the blockchain network (e.g., a sidechain). In some implementations, the sender is a token issuer. The transfer request initiates a transfer function to facilitate the transfer request. For example, the transfer function can be a function of a smart contract.

Each digital wallet can have a respective token balance that includes, for one or more attribution properties, one or more respective attributed token balances, and a float token balance of tokens lacking an attribution property (i.e., a number of non-attributed tokens). Each token balance can be stored within a token contract. Each attribution property identifies a corresponding token issuer. The attributed token balance and the float token balance are each greater than or equal to zero. In some implementations, the attributed token balance includes a first attributed token having a first attribution property and a second attributed token having a second attribution property different from the first attribution property.

For example, assume that the token balance within a digital wallet is represented by M C|N, where C is an attribution property (e.g., token color), M is the attributed token balance for attributed tokens having attribution property C, N is a float token balance, and the token balance is M+N. Illustratively, token balance of a digital wallet with 7 attributed tokens having attribution property C and 3 float tokens can be represented by 7 C|3, and the token balance is 10. Although only a single attribution property C is shown in these examples, any number of attribution properties can be defined in accordance with implementations described herein (e.g., $M_1C_1$, $M_2C_2$, . . . , $M_NC_N$). A designated attribution property (e.g., primary token color) can be designated for a user account (e.g., digital wallet).

At operation 620B, processing logic causes a set of tokens to be transferred from the sender to the receiver. More specifically, processing logic can trigger (e.g., call) a transfer function of the token contract.

The transfer function can determine a transaction payload. More specifically, the transaction payload includes at least one of: a number of attributed tokens debited from the attributed token balance or a number of float tokens debited from the float token balance. In some implementations, determining the transaction payload includes applying the float token balance to the transfer amount of tokens to obtain a remaining transfer amount of tokens, and determining whether the remaining transfer amount of tokens is greater than zero. In response to determining that the remaining transfer amount of tokens is equal to zero, determining the transaction payload can further include outputting the transaction payload. In response to determining that the remaining transfer amount of tokens is greater than zero, determining the transaction payload can further include applying the attributed token balance to the remaining transfer amount of tokens, and in response to applying the attributed token balance to the remaining transfer amount of tokens, outputting the transaction payload.

For example, the transfer function can include a debit function in which the transfer amount is debited from the token balance of the sender (e.g., the token balance of the digital wallet of the sender) to obtain the transaction payload. The debit function can utilize the float token balance of the first digital wallet before the attributed token balance of the first digit wallet, and the transaction payload defines the number of debited attributed tokens and the number of debited float tokens. As an illustrative example, if the sender has a token balance of 7 B|3 (e.g., B is the color blue) and the transfer amount is 5, then the updated token balance of the sender is 7 B|3−5=5 B|0, the number of debited attributed tokens is 2, the number of debited float tokens is 3, and the transaction payload is 2 B|3.

For example, the transfer function can further include a credit function in which the transaction payload is credited to the token balance of the receiver to obtain an updated token balance of the receiver. The transaction payload can be credited to the token balance of the receiver based on at least one designated attribution property assigned to the receiver.

It can be advantageous to reduce the number of float tokens in circulation. To do so, in some implementations, causing the set of tokens to be transferred from the sender to the receiver includes determining, based on a float token credit balance defined for a designated attribution property assigned to the receiver, whether a float token is convertible into an attributed token having the designated attribution property assigned to the receiver. For example, the designated attribution property assigned to the receiver can be a preferred attribution property selected by the receiver. If the float token is convertible into an attributed token having a designated attribution property for the receiver, then the float token can be converted into an attributed token having a designated attribution property assigned to the receiver. For example, the conversion can be performed by triggering an attribution function (e.g., of the smart contract). In some implementations, the attribution function is an unwrap function. If the float token is not convertible into an attributed token having a designated attribution property assigned to the receiver, then the float token is sent to the receiver without being converted into an attributed token having a designated attribution property assigned to the receiver.

It may be the case that an attributed token being sent from by the sender has an attribution property different from a designated attribution property assigned to the receiver. To address this, in some implementations, causing the set of tokens to be transferred from the sender to the receiver includes determining whether the attribution property of an attributed token being sent by the sender is different from a designated attribution property assigned to the receiver. If the attribution property of the attributed token being sent by the sender is the same as a designated attribution property assigned to the receiver, then the transfer function can cause the attributed token to be sent to the receiver without being converted into a float token.

If the attribution property of an attributed token being sent by the sender is different from a designated attribution property assigned to the receiver, then the transfer function can cause the attributed token to be converted into a float token. For example, the conversion can be performed by processing logic triggering a de-attribution function of the transfer function. For example, the de-attribution function can be a wrap function that wraps an attributed token with a "float property" that converts the attributed token into a float token. The de-attribution function can have an argument including the number of attributed tokens having a specified attribution property, and can output the corresponding number of float tokens. The total number of float tokens (i.e., float amount) is a non-negative integer less than or equal to the mint amount. Thus, the number of attributed tokens defined by the input of the wrap function is a non-negative integer less than or equal to the mint amount. The float token credit balance defined for the designated attribution property assigned to the receiver can be incremented to account for the conversion of the attributed token into the float token. This is done to keep track of the number of attributed tokens in circulation having the attribution property, which can ensure that the token issuer is credited as the originator of those tokens.

In some implementations, the transfer function implements a float minimization strategy. More specifically, if a number of first attributed tokens having a first attribution property within a transaction payload is less than the number of second attributed tokens of the receiver having a second attribution property designated for the receiver, then the first attributed tokens are converted into float tokens and added to the float token balance of the second digital wallet. Otherwise, if the number of first attributed tokens is greater than the number of second attributed tokens, then the second attributed tokens are converted into float tokens and added to the float token balance of the receiver. To illustrate the float minimization strategy, if the transaction payload is 5 B|5 and the receiver's token balance is 7 G|0 (e.g., B is the color blue and G is the color green), then the 5 attributed tokens having attribution property B are converted to float tokens and the receiver's updated token balance becomes 7 G|10. As another example, if the transaction payload is 5 B|5 and the receiver's token balance is 3 G|0, then the 3 attributed tokens having attribution property G are converted to float tokens and the receiver's updated token balance becomes 5 B|8. The float minimization strategy can be generalized for a system including any suitable number of attribution properties. Further details regarding operations 610C-630C are described above with reference to FIGS. 1A-6B and will now be described below with reference to FIG. 7.

FIG. 7 is a table 700 illustrating example token transactions that can be performed within a system that implements blockchain-based token attribution with reduced computational complexity, in accordance with some implementations. In this illustrative example, we are assuming that a system includes a digital wallet under control of user "Alice", a digital wallet under control of user "Bob" and a digital wallet under control of user "Carol". Table 700 includes transaction column 710 indicating a token transaction performed within the system, an Alice token balance column 720 indicating Alice's token balance after each transaction, a Bob token balance column 730 indicating Bob's token balance after each transaction, a Carol token balance column 740 indicating Carols' token balance after each transaction, a float credit column 750 indicating, for each attribution property, a respective float token credit equal to the total number of attributed tokens that have been converted to float tokens within the system after each transaction, and a total circulation (attribution) column 760 indicating, for each attribution property, a respective total circulation balance for the attribution property equal to the sum of the total attributed token balance and the total float token credit.

Each token balance 720-740 can be in the form A|F, where A is the attributed token balance and F is the float token balance. In this illustrative example, it is assumed that token balances are each initialized at 0 (i.e., 0|0). Additionally, it is assumed in this illustrative example that Alice's attribution property is G (e.g., the color green), Carol's attribution property is R (e.g., the color red), and Bob's preferred attribution property is G. Each token balance 720-760 can be maintained in a token contract.

During a first transaction, Alice, as a token issuer, mints 100 attributed tokens having attribution property ("property") G (100 G). For example, as described above with reference to FIG. 1A, Alice can cause a token factory to trigger a mint function to mint 100 G. As indicated by Alice token balance column 720, Alice's token balance stored is updated from 0|0 to 100 G|0 after the first transaction. As indicated by token balance columns 730 and 740, Bob and Carol's token balances are left unchanged at 0|0 after the first transaction. As indicated by float credit column 750, a float token balance for G is initialized to zero after the first transaction. As indicated by total circulation column 760, since no attributed tokens have been redeemed, the total circulation balance for G is set to 100 after the first transaction.

During a second transaction, Alice transfers 50 tokens to Bob by sending a transfer request to a token transaction platform that interacts with a transfer function of the token contract. Since Alice only has attributed tokens having attribution property G in her token balance, the transfer function causes 50 tokens to be transferred to Bob having attribution property G. As indicated by Alice token balance column 720, Alice's token balance is updated to 50 G|0 after the second transaction. As indicated by Bob token balance column 730, since G is Bob's preferred attribution property, Bob's token balance is updated to 50 G|0 after the second transaction. As indicated by Carol token balance column 740, Carol's token balance is left unchanged at 0|0 after the second transaction. As indicated by float credit column 750, since no attributed tokens having attribution property G needed to be converted to float tokens during the second transaction, the float token balance for G remains zero after the second transaction. As indicated by total circulation column 760, since no attributed tokens have been redeemed, the total circulation balance for G remains 100 after the second transaction.

During a third transaction, Carol, as a token issuer, mints 100 attributed tokens having attribution property ("property") R (100 R). For example, as described above with reference to FIG. 1A, Carol can cause a token factory to trigger a mint function to mint 100 R. As indicated by token balance columns 720 and 730, Alice and Bob's token balances each remain 50 G|0 after the third transaction. As indicated by Carol token balance column 740, Carol's token balance is updated from 0|0 to 100 R|0 after the third transaction. As indicated by float credit column 750, the float token balance for G remains at zero and a float token balance for R is initialized to zero after the third transaction. As indicated by total circulation column 760, since no attributed tokens have been redeemed, the total circulation balance for G remains at 100 and the total circulation balance for R is set to 100 after the third transaction.

During a fourth transaction, Bob transfers 20 tokens to Carol by sending a transfer request to the token transaction platform. Since Bob only has attributed tokens having attribution property G in his token balance, the transfer function causes 20 tokens to be transferred to Carol having attribution property G. As indicated by Alice token balance column 720, Alice's token balance remains at 50 G|0 after the fourth transaction. As indicated by Bob token balance column 730, Bob's token balance is updated to 30 G|0 after the fourth transaction. As indicated by Carol token balance column 740, Carol's token balance is updated to 100 R|20 after the fourth transaction. More specifically, the 20 G transferred from Bob to Carol are all converted to float tokens (e.g., wrapped) during the fourth transaction. For example, the token contract can include a transfer function that converts the 20 G to float tokens to enable the fourth transaction to be completed. As indicated by float credit column 750, since 20 G were converted to float tokens during the fourth transaction, the float token balance for G is updated to 20 after the fourth transaction (and the float token balance for R remains zero). As indicated by total circulation column 760, since no attributed tokens have been redeemed, the total circulation balances for G and R remain 100 after the fourth transaction.

During a fifth transaction, Carol transfers 30 tokens to the digital wallet of Alice by sending a transfer request to the token transaction platform. To reduce the number of float tokens in circulation, to perform the fifth transaction, the transfer function can cause all of Carol's 20 float tokens to be converted to attributed tokens having attribution property G (e.g., there is only a float credit balance for attribution property G) and can cause the remaining 10 tokens to be debited from the 100 R token balance (10 R). However, since Alice's attribution property is G, the 10 R transferred from Carol to Alice are all converted by the transfer function to float tokens (e.g., wrapped) during the fifth transaction to enable the fifth transaction to be completed. Thus, Alice will receive 20 G and 10 float tokens as a result of the fifth transaction.

As indicated by Alice token balance column 720, Alice's token balance is updated to 70 G|10 after the fifth transaction. As indicated by Bob token balance column 730, Bob's token balance remains at 30 G|0 after the fifth transaction. As indicated by Carol token balance column 740, Carol's token balance is updated to 90 R|0 after the fifth transaction. As indicated by float credit column 750, since 20 float tokens for G were converted to 20 G and 10 G were converted to float tokens during the fifth transaction, the float token balance for G is updated to zero and the float token balance for R is updated to 10 after the fifth transaction. As indicated by total circulation column 760, since no attributed tokens have been redeemed, the total circulation balances for G and R remain 100 after the fifth transaction.

During a sixth transaction, Bob redeems 20 G. For example, as described above with reference to FIG. 1A, Bob can cause a token factory to trigger a redemption function to redeem 20 G. As indicated by Alice token balance column 720, Alice's token balance remains 70 G|10 after the sixth transaction. As indicated by Bob token balance column 730, Bob's token balance is updated to 10 G|0 after the sixth transaction. As indicated by Carol token balance column 740, Carol's token balance remains 90 R|0 after the sixth transaction. As indicated by float credit column 750, the float token balance for G remains at zero and the float token balance for R remains at 10 after the sixth transaction. As indicated by total circulation column 760, since 20 G have been redeemed, the total circulation balance for G is updated to 80 and the total circulation balance for R remains at 100 after the sixth transaction.

During a seventh transaction, Alice redeems 20 G and 10 R. For example, as described above with reference to FIG. 1A, Alice can cause a token factory to trigger a redemption function to redeem 20 G and 10 R. To redeem 10 R, the 10 float tokens in Alice's token balance are first converted to 10 R (e.g., unwrapped) to enable the seventh transaction to be completed.

As indicated by Alice token balance column 720, Alice's token balance is updated 50 G|0 after the seventh transaction. As indicated by Bob token balance column 730, Bob's token balance remains at 10 G|0 after the seventh transaction. As indicated by Carol token balance column 740, Carol's token balance remains 90 R|0 after the seventh transaction. As indicated by float credit column 750, the float token balance for G remains at zero and the float token balance for R is updated to zero after the seventh transaction. As indicated by total circulation column 760, since 20 G and 10 R have been redeemed, the total circulation balance for G is updated to 60 and the total circulation balance for R remains at 90 after the seventh transaction.

Figure 8:
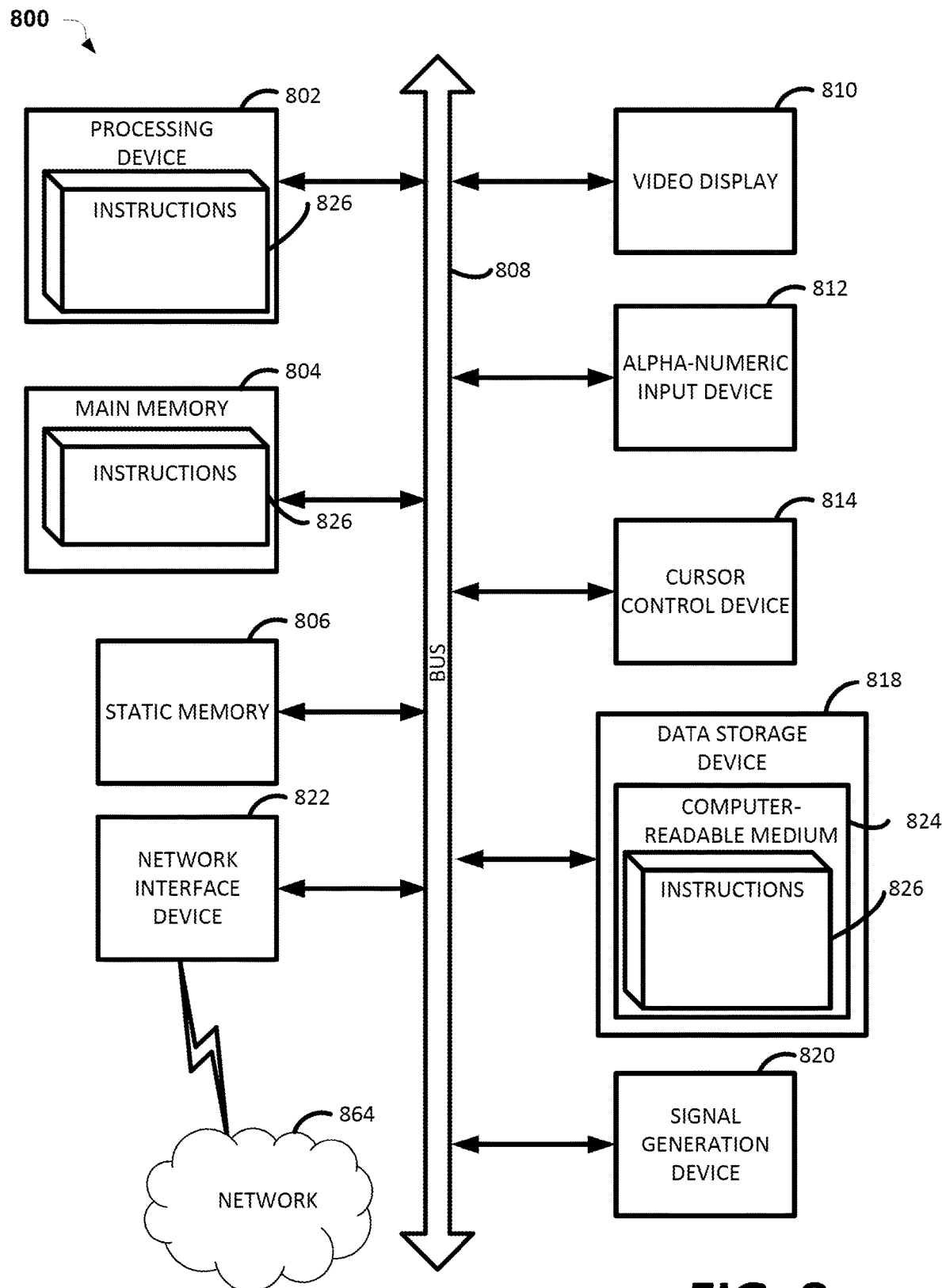
FIG. 8 is a block diagram of an illustrative computing device operating in accordance with the examples of the disclosure.

FIG. 8 depicts a block diagram of a computer system 800 operating in accordance with one or more aspects of the disclosure. In various illustrative examples, computer system 800 may correspond to one or more components of systems 100, 100 and 200 of FIGS. 1-2B. Computer system 800 may be included within a data center that supports virtualization. Virtualization within a data center can result in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network 864, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of executable instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820. Data storage device 816 may include a non-transitory computer-readable storage medium 824 on which may store instructions 826 encoding any one or more of the methods or functions described herein. Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of executable instructions for execution by a computer that causes the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner. In certain implementations, not all operations or sub-operations of the methods herein are required to be performed.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "obtaining,"

"receiving," "causing," "executing," "sending," "initiating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
    receiving, by at least one processing device, a transfer request defining a transfer amount of tokens to be transferred from sender associated with a first digital wallet to a receiver associated with a second digital wallet, wherein the sender has a total token balance comprising an attributed token balance of attributed tokens having a first attribution property identifying a corresponding token issuer, and a float token balance of float tokens, wherein the attributed token balance and the float token balance are maintained within a token contract, and wherein the receiver is assigned with a designated attribution property;
    causing, by the at least one processing device, a transfer function of the token contract to be executed to transfer a set of tokens from the sender to the receiver, wherein the set of tokens is determined based on a transaction payload comprising at least one of: a number of attributed tokens debited from the attributed token balance or a number of float tokens debited from the float token balance; and
    storing, by the at least one processing device, the total token balance for the sender with a space complexity that is sublinear with respect to a total number of token issuers due to the use of the attributed token balance or the float token balance.

2. The method of claim 1, wherein the token contract is a smart contract.

3. The method of claim 1, wherein the transaction payload is determined by:
    applying the float token balance to the transfer amount of tokens to obtain a remaining transfer amount of tokens;
    determining whether the remaining transfer amount of tokens is greater than zero;
    in response to determining that the remaining transfer amount of tokens is greater than zero, applying the attributed token balance to the remaining transfer amount of tokens; and
    in response to applying the attributed token balance to the remaining transfer amount of tokens, outputting the transaction payload.

4. The method of claim 1, wherein causing the set of tokens to be transferred from the sender to the receiver further comprises:
    determining, based on a float token credit balance defined for the designated attribution property, whether a float token is convertible into an attributed token having the designated attribution property; and
    in response to determining that the float token is convertible into an attributed token having the designated attribution property, causing the float token to be converted into an attributed token having the designated attribution property by triggering an attribution function of the token contract.

5. The method of claim 4, wherein the attribution function is an unwrap function.

6. The method of claim 1, wherein causing the set of tokens to be transferred from the sender to the receiver further comprises:
    determining whether the first attribution property is different from the designated attribution property; and in response to determining that the first attribution property is different from the designated attribution property, causing an attributed token having the first attribution property to be converted into a float token by triggering a de-attribution function of the token contract.

7. The method of claim 6, wherein the de-attribution function is a wrap function.

8. The method of claim 1, wherein the first digital wallet is associated with a first blockchain, and wherein the second digital wallet is associated with a second blockchain different from the first blockchain.

9. The method of claim 1, wherein the token contract maps an address of the first digital wallet to the total token balance of the sender.

10. A system comprising:
a memory; and
at least one processing device, operatively coupled to the memory, to perform operations comprising:
receiving a transfer request defining a transfer amount of tokens to be transferred from sender associated with a first digital wallet to a receiver associated with a second digital wallet, wherein the sender has a total token balance comprising an attributed token balance of attributed tokens having a first attribution property identifying a corresponding token issuer, and a float token balance of float tokens, wherein the attributed token balance and the float token balance are maintained within a token contract, and wherein the receiver is assigned with a designated attribution property;
causing a transfer function of the token contract to be executed to transfer a set of tokens from the sender to the receiver, wherein the set of tokens is determined based on a transaction payload comprising at least one of: a number of attributed tokens debited from the attributed token balance or a number of float tokens debited from the float token balance; and
storing the total token balance for the sender with a space complexity that is sublinear with respect to a total number of token issuers due to the use of the attributed token balance or the float token balance.

11. The system of claim 10, wherein the token contract is a smart contract.

12. The system of claim 10, wherein the transaction payload is determined by:

applying the float token balance to the transfer amount of tokens to obtain a remaining transfer amount of tokens;
determining whether the remaining transfer amount of tokens is greater than zero; in response to determining that the remaining transfer amount of tokens is greater than zero, applying the attributed token balance to the remaining transfer amount of tokens; and
in response to applying the attributed token balance to the remaining transfer amount of tokens, outputting the transaction payload.

13. The system of claim 10, wherein causing the set of tokens to be transferred from the sender to the receiver further comprises:
determining, based on a float token credit balance defined for the designated attribution property, whether a float token is convertible into an attributed token having the designated attribution property; and
in response to determining that the float token is convertible into an attributed token having the designated attribution property, causing the float token to be converted into an attributed token having the designated attribution property by triggering an attribution function of the token contract.

14. The system of claim 13, wherein the attribution function is an unwrap function.

15. The system of claim 10, wherein causing the set of tokens to be transferred from the sender to the receiver further comprises:
determining whether the first attribution property is different from the designated attribution property; and
in response to determining that the first attribution property is different from the designated attribution property, causing an attributed token having the first attribution property to be converted into a float token by triggering a de-attribution function of the token contract.

16. The system of claim 15, wherein the de-attribution function is a wrap function.

17. The system of claim 10, wherein the first digital wallet is associated with a first blockchain, and wherein the second digital wallet is associated with a second blockchain different from the first blockchain.

18. The system of claim 10, wherein the token contract maps an address of the first digital wallet to the total token balance of the sender.

* * * * *